US011924895B2

(12) United States Patent
Damnjanovic et al.

(10) Patent No.: US 11,924,895 B2
(45) Date of Patent: Mar. 5, 2024

(54) TECHNIQUES FOR NEW RADIO LAYER TWO RELAY

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 17/167,959

(22) Filed: Feb. 4, 2021

(65) Prior Publication Data
US 2021/0259034 A1    Aug. 19, 2021

Related U.S. Application Data

(60) Provisional application No. 62/977,135, filed on Feb. 14, 2020.

(51) Int. Cl.
*H04W 76/15* (2018.01)
*H04W 8/22* (2009.01)
(Continued)

(52) U.S. Cl.
CPC ............. *H04W 76/15* (2018.02); *H04W 8/22* (2013.01); *H04W 24/10* (2013.01); *H04W 72/12* (2013.01); *H04W 76/14* (2018.02); *H04W 88/04* (2013.01)

(58) Field of Classification Search
CPC ..... H04W 76/15; H04W 76/14; H04W 88/04; H04W 72/12; H04W 24/10; H04W 8/22
See application file for complete search history.

(56) References Cited

U.S. PATENT DOCUMENTS 6,915,477 B2 * 7/2005 Gollamudi ............ H04L 1/0026
                                                      375/232
7,359,327 B2 * 4/2008 Oshiba ..................... H04L 1/20
                                                      370/465
(Continued)

FOREIGN PATENT DOCUMENTS

WO    2018031343 A1    2/2018
WO    2018204131 A1    11/2018

OTHER PUBLICATIONS

3rd Generation Partnership Project, Technical Specification Group Services and System Aspects, Study on Extended Architecture Support for Proximity-based Services (Release 13), 3GPP Standard, Technical Report, 3GPP TR 23.713, 3rd Generation Partnership Project (3GPP), Mobile Competence Centre, 650, Route Des Lucioles, F-06921 Sophia-Antipolis Cedex, France, vol. SA WG2, No. V13. 0.0, Sep. 15, 2015, pp. 1-80, XP051294298, [retrieved on Sep. 15, 2015], The whole document.

(Continued)

*Primary Examiner* — Parth Patel
(74) *Attorney, Agent, or Firm* — ArentFox Schiff LLP

(57) ABSTRACT

Techniques for new radio layer two relay are disclosed. In an example, a base station may configure a user equipment (UE) and a relay UE having individual direct communication links with the base station to configure a sidelink communication link between the UE and the relay UE. The sidelink communication link may allow the UE to communicate with the base station via the direct communication link between the base station and the UE and the sidelink communication link between the UE and the relay UE.

30 Claims, 17 Drawing Sheets

(51) Int. Cl.
  *H04W 24/10* (2009.01)
  *H04W 72/12* (2023.01)
  *H04W 76/14* (2018.01)
  *H04W 88/04* (2009.01)

(56) References Cited

U.S. PATENT DOCUMENTS

| | | | | |
|---|---|---|---|---|
| 7,583,968 B2* | 9/2009 | Kimura | ............... | H04L 1/0034 714/751 |
| 8,340,580 B1* | 12/2012 | Epstein | ............... | H04B 1/406 455/73 |
| 8,654,653 B2* | 2/2014 | Bae | ............... | H04W 76/18 370/242 |
| 8,730,921 B2* | 5/2014 | Al-Khudairi | ....... | H04W 36/305 370/332 |
| 8,929,202 B2* | 1/2015 | Wahlqvist | ............ | H04W 76/19 370/344 |
| 8,954,056 B2* | 2/2015 | Shimizu | ............ | H04W 76/19 370/216 |
| 9,055,497 B2* | 6/2015 | Koo | ............... | H04W 36/20 |
| 9,094,858 B2* | 7/2015 | Burbidge | ............ | H04W 76/19 |
| 9,414,430 B2* | 8/2016 | Vajapeyam | ........ | H04W 76/16 |
| 9,717,075 B2* | 7/2017 | Koo | ............... | H04W 88/10 |
| 10,194,402 B2* | 1/2019 | Balachandran | ........ | H04B 17/18 |
| 10,306,599 B2* | 5/2019 | Agiwal | ............... | H04W 72/04 |
| 10,609,744 B2* | 3/2020 | Kim | ............... | H04W 40/04 |
| 10,681,753 B2* | 6/2020 | Lecroart | ............... | H04W 76/12 |
| 10,820,225 B2* | 10/2020 | Jung | ............... | H04W 74/002 |
| 11,019,543 B2* | 5/2021 | Kumar | ............... | H04W 36/08 |
| 11,297,561 B2* | 4/2022 | Zhao | ............... | H04W 80/02 |
| 2008/0171550 A1* | 7/2008 | Zhao | ............... | H04W 74/02 455/445 |
| 2011/0194630 A1* | 8/2011 | Yang | ............... | H04L 5/0053 370/242 |
| 2012/0236717 A1* | 9/2012 | Saska | ............... | H04W 36/22 370/235 |
| 2012/0307621 A1* | 12/2012 | Zawaideh | ............ | H04W 76/19 370/216 |
| 2013/0039287 A1* | 2/2013 | Rayavarapu | ........ | H04W 72/042 370/329 |
| 2013/0324114 A1* | 12/2013 | Raghothaman | ....... | H04W 76/14 455/426.1 |
| 2014/0004888 A1* | 1/2014 | Ando | ............... | H04W 72/08 455/456.6 |
| 2014/0056243 A1* | 2/2014 | Pelletier | ............... | H04W 76/15 370/329 |
| 2014/0064124 A1* | 3/2014 | Paladugu | ............ | H04W 76/19 370/252 |
| 2014/0080468 A1* | 3/2014 | Zhang | ............... | H04W 24/02 455/418 |
| 2014/0328329 A1* | 11/2014 | Novlan | ............ | H04W 56/0015 370/336 |
| 2016/0044518 A1* | 2/2016 | Centonza | ........ | H04W 36/00837 370/328 |
| 2016/0127918 A1* | 5/2016 | Yi | ............... | H04L 5/0053 370/329 |
| 2016/0135247 A1* | 5/2016 | Ozturk | ............ | H04W 52/0212 455/436 |
| 2016/0150450 A1* | 5/2016 | Balasubramanian | ... | H04W 8/08 370/331 |
| 2016/0302127 A1* | 10/2016 | Moon | ............... | H04W 76/19 |
| 2016/0360349 A1* | 12/2016 | Goto | ............... | H04W 4/80 |
| 2017/0094656 A1* | 3/2017 | Chen | ............... | H04W 76/19 |
| 2017/0142741 A1* | 5/2017 | Kaur | ............... | H04W 76/19 |
| 2017/0181154 A1* | 6/2017 | Zhou | ............... | H04W 72/048 |
| 2017/0201943 A1* | 7/2017 | Hsu | ............... | H04W 52/0225 |
| 2017/0208638 A1* | 7/2017 | Baghel | ............... | H04W 76/14 |
| 2017/0230780 A1* | 8/2017 | Chincholi | ............... | H04L 1/20 |
| 2017/0230941 A1* | 8/2017 | Agiwal | ............... | H04W 40/22 |
| 2017/0331577 A1* | 11/2017 | Parkvall | ............... | H04L 5/1469 |
| 2017/0366236 A1* | 12/2017 | Ryoo | ............... | H04B 7/0421 |
| 2018/0017973 A1* | 1/2018 | Teague | ............... | H04W 4/029 |
| 2018/0035332 A1* | 2/2018 | Agiwal | ............... | H04W 72/1247 |
| 2018/0049053 A1* | 2/2018 | Kaikkonen | ............ | H04W 24/08 |
| 2018/0049260 A1* | 2/2018 | Aminaka | ............ | H04W 56/002 |
| 2018/0054800 A1* | 2/2018 | Yeo | ............... | H04L 1/0041 |
| 2018/0063865 A1* | 3/2018 | Islam | ............... | H04L 5/0064 |
| 2018/0070264 A1* | 3/2018 | Saiwai | ............... | H04W 72/04 |
| 2018/0070341 A1* | 3/2018 | Islam | ............... | H04L 1/1812 |
| 2018/0077608 A1* | 3/2018 | Jung | ............... | H04W 76/14 |
| 2018/0098370 A1* | 4/2018 | Bangolae | ............ | H04W 88/04 |
| 2018/0110082 A1* | 4/2018 | Saily | ............... | H04W 76/15 |
| 2018/0124621 A1* | 5/2018 | Jung | ............... | H04W 24/10 |
| 2018/0124825 A1* | 5/2018 | Lee | ............... | H04W 74/006 |
| 2018/0184443 A1* | 6/2018 | Li | ............... | H04W 72/1268 |
| 2018/0192436 A1* | 7/2018 | Yi | ............... | H04W 72/14 |
| 2018/0213577 A1* | 7/2018 | Burbidge | ............ | H04W 76/10 |
| 2018/0220344 A1* | 8/2018 | Shaheen | ............ | H04W 36/0085 |
| 2018/0227282 A1* | 8/2018 | Lee | ............... | H04W 12/06 |
| 2018/0242282 A1* | 8/2018 | Li | ............... | H04W 72/08 |
| 2018/0255532 A1* | 9/2018 | Li | ............... | H04L 1/18 |
| 2018/0262289 A1* | 9/2018 | Li | ............... | H04L 5/0035 |
| 2018/0270799 A1* | 9/2018 | Noh | ............... | H04L 5/0051 |
| 2018/0278310 A1* | 9/2018 | Lee | ............... | H04B 7/0645 |
| 2018/0279289 A1* | 9/2018 | Islam | ............... | H04W 72/1242 |
| 2018/0279360 A1* | 9/2018 | Park | ............... | H04L 5/0092 |
| 2018/0287762 A1* | 10/2018 | Sun | ............... | H04L 5/0096 |
| 2018/0288740 A1* | 10/2018 | Ansari | ............... | H04W 16/10 |
| 2018/0294911 A1* | 10/2018 | Sun | ............... | H04W 48/12 |
| 2018/0295651 A1* | 10/2018 | Cao | ............... | H04W 72/14 |
| 2018/0302889 A1* | 10/2018 | Guo | ............... | H04B 7/088 |
| 2018/0316395 A1* | 11/2018 | Sundararajan | ........ | H04W 72/10 |
| 2018/0316412 A1* | 11/2018 | Senior | ............... | H04W 52/46 |
| 2018/0324842 A1* | 11/2018 | Gulati | ............... | H04W 72/1263 |
| 2018/0338253 A1* | 11/2018 | Nagaraja | ............ | H04B 17/382 |
| 2018/0343154 A1* | 11/2018 | Park | ............... | H04L 5/0007 |
| 2018/0352601 A1* | 12/2018 | Park | ............... | H04L 5/0055 |
| 2018/0368116 A1* | 12/2018 | Liao | ............... | H04L 5/0048 |
| 2018/0368205 A1* | 12/2018 | Park | ............... | H04W 76/34 |
| 2019/0020506 A1* | 1/2019 | Cheng | ............... | H04L 1/1819 |
| 2019/0021119 A1* | 1/2019 | Ng | ............... | H04W 48/10 |
| 2019/0028174 A1* | 1/2019 | Chakraborty | ........ | H04L 27/2692 |
| 2019/0044649 A1* | 2/2019 | Kim | ............... | H04L 5/0053 |
| 2019/0053029 A1* | 2/2019 | Agiwal | ............... | H04W 4/90 |
| 2019/0053293 A1* | 2/2019 | Akoum | ............... | H04W 24/10 |
| 2019/0058517 A1* | 2/2019 | Kang | ............... | H04L 5/0023 |
| 2019/0058519 A1* | 2/2019 | Davydov | ............... | H04L 67/10 |
| 2019/0089579 A1* | 3/2019 | Sang | ............... | H04W 76/27 |
| 2019/0132778 A1* | 5/2019 | Park | ............... | H04B 17/309 |
| 2019/0141771 A1* | 5/2019 | Ma | ............... | H04W 76/27 |
| 2019/0174554 A1* | 6/2019 | Deenoo | ............... | H04W 76/27 |
| 2019/0182884 A1* | 6/2019 | Deenoo | ............... | H04W 24/08 |
| 2019/0200249 A1* | 6/2019 | Yoon | ............... | H04W 72/042 |
| 2019/0200345 A1* | 6/2019 | Zhang | ............... | H04L 5/0044 |
| 2019/0306737 A1* | 10/2019 | Kwak | ............... | H04W 24/08 |
| 2019/0320355 A1* | 10/2019 | Da Silva | ............ | H04W 76/19 |
| 2019/0320361 A1* | 10/2019 | Uchiyama | ............ | H04W 88/04 |
| 2019/0320467 A1* | 10/2019 | Freda | ............... | H04W 74/0833 |
| 2019/0349960 A1* | 11/2019 | Li | ............... | H04L 27/26136 |
| 2019/0357101 A1* | 11/2019 | Stojanovski | ........ | H04W 4/50 |
| 2019/0357284 A1* | 11/2019 | Xu | ............... | H04W 76/14 |
| 2020/0008216 A1* | 1/2020 | Iyer | ............... | H04W 72/042 |
| 2020/0029237 A1* | 1/2020 | Kim | ............... | H04W 68/02 |
| 2020/0029366 A1* | 1/2020 | Xiong | ............... | H04L 1/1607 |
| 2020/0037132 A1 | 1/2020 | Wu et al. | | |
| 2020/0059404 A1* | 2/2020 | Liu | ............... | H04L 41/0806 |
| 2020/0059915 A1* | 2/2020 | Lee | ............... | H04W 72/0406 |
| 2020/0068532 A1* | 2/2020 | Bengtsson | ............ | H04W 76/14 |
| 2020/0107381 A1* | 4/2020 | Ahmad | ............... | H04W 52/0212 |
| 2020/0163028 A1* | 5/2020 | Chae | ............... | H04W 52/38 |
| 2020/0187258 A1* | 6/2020 | Lee | ............... | H04W 74/0833 |
| 2020/0213837 A1* | 7/2020 | Pan | ............... | H04W 72/042 |
| 2020/0296738 A1* | 9/2020 | Inokuchi | ............ | H04W 72/1268 |
| 2020/0314772 A1* | 10/2020 | Roth-Mandutz | .... | H04L 27/2607 |
| 2020/0351669 A1* | 11/2020 | Xu | ............... | H04W 72/042 |
| 2020/0351853 A1* | 11/2020 | Xiong | ............... | H04L 5/0023 |
| 2020/0359428 A1* | 11/2020 | Pan | ............... | H04W 76/14 |
| 2021/0068176 A1* | 3/2021 | Luo | ............... | H04W 4/40 |
| 2021/0112591 A1* | 4/2021 | Lee | ............... | H04W 74/0833 |
| 2021/0153062 A1* | 5/2021 | Zhang | ............... | H04W 28/0231 |
| 2021/0153063 A1* | 5/2021 | Zhang | ............... | H04W 76/14 |
| 2021/0212123 A1* | 7/2021 | Reial | ............... | H04W 72/08 |

(56) References Cited

U.S. PATENT DOCUMENTS

| | | | | |
|---|---|---|---|---|
| 2021/0259034 A1* | 8/2021 | Damnjanovic | ....... | H04W 76/15 |
| 2021/0337544 A1* | 10/2021 | Wang | ...................... | H04W 4/06 |
| 2021/0337583 A1* | 10/2021 | Li | ...................... | H04W 72/0453 |
| 2022/0007447 A1* | 1/2022 | Hong | ...................... | H04W 76/18 |
| 2022/0060954 A1* | 2/2022 | Xu | ........................ | H04W 36/00 |
| 2022/0095186 A1* | 3/2022 | Zhang | ............... | H04W 36/0044 |
| 2022/0110105 A1* | 4/2022 | Belleschi | ............ | H04W 72/042 |

OTHER PUBLICATIONS

"3rd Generation Partnership Project; Technical Specification Group Services and System Aspects; Proximity-Based Services (ProSe); Security Aspects (Release 15)", 3GPP Standard, Technical Specification, 3GPP TS 33.303, 3rd Generation Partnership Project (3GPP), Mobile Competence Centre, 650, Route Des Lucioles, F-06921 Sophia-Antipolis Cedex, France, 3GPP TS 33.303, V15.0.0, Jun. 22, 2018, 90 Pages, XP051473871 [retrieved on Jun. 22, 2018], The whole document.

"3rd Generation Partnership Project, Technical Specification Group Services and System Aspects, Proximity-Based Services (ProSe), Stage 2 (Release 15)", 3GPP Standard, Technical Specification, 3GPP TS 23.303, 3rd Generation Partnership Project (3GPP), Mobile Competence Centre, 650, Route Des Lucioles, F-06921 Sophia-Antipolis Cedex, France, V15.1.0, Jun. 30, 2018 (Jun. 30, 2018), pp. 1-130, XP051472857, Retrieved from the Internet: URL: https://www.3gpp.org/ftp/Specs/archive/23_series/23.303/23303-f10.zip. [retrieved on May 5, 2021], The whole document.

"3rd Generation Partnership Project, Technical Specification Group Services and System Aspects, Study on Architecture Enhancements to Support Proximity-Based Services (ProSe) (Release 12)", 3GPP Standard, Technical Report, 3GPP TR 23.703, 3rd Generation Partnership Project (3GPP), Mobile Competence Centre, 650, Route Des Lucioles, F-06921 Sophia-Antipolis Cedex, France, vol. SA WG2. No. V12.0.0, Mar. 10, 2014 (Mar. 10, 2014), pp. 1-324, The whole document.

International Search Report and Written Opinion—PCT/US2021/016877—ISA/EPO—dated May 14, 2021.

* cited by examiner

TECHNIQUES FOR NEW RADIO LAYER TWO RELAY

CROSS-REFERENCE TO RELATED APPLICATION

This application claims the benefit of U.S. Provisional Application Ser. No. 62/977,135, entitled "TECHNIQUES FOR NEW RADIO LAYER TWO RELAY" and filed on Feb. 14, 2020, which is expressly incorporated by reference herein in its entirety.

BACKGROUND

Aspects of the present disclosure relate generally to communication systems, and more particularly, to techniques for new radio (NR) layer two relay.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) NR technologies. 5G NR technologies are a part of a continuous mobile broadband evolution promulgated by Third Generation Partnership Project (3GPP) to meet new requirements associated with latency, reliability, security, scalability (e.g., with Internet of Things (IoT)), and other requirements. 5G NR technologies include services associated with enhanced mobile broadband (eMBB), massive machine type communications (mMTC), and ultra reliable low latency communications (URLLC). Some aspects of 5G NR technologies may be based on fourth generation (4G) Long Term Evolution (LTE) standards.

During beam management, communication links between base stations and a user equipment (UE) may be impaired or blocked on a short term scale. For example, an object, such as a user's hand, may block a communication link between the user's UE and the base station. In some aspects, communication link diversity, such as selection and aggregation, may be used to provide a better communication link. However, impaired or blocked communication links may still occur when using communication link diversity.

Accordingly, there exists a need for further improvements in 5G NR technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, an example method of wireless communication by a base station includes establishing a first direct communication link with a user equipment (UE). The method also includes establishing a second direct communication link with a relay UE. The method also includes communicating configuration information with the UE and the relay UE to individually configure the UE and the relay UE for a sidelink (SL) communication link to enable the relay UE to relay communications between the base station and the UE. The method also includes receiving data from and transmitting data to the UE on both the first direct communication link and the second direct communication link in response to the SL communication link being established.

In another aspect, an example method of wireless communication by a UE includes establishing a first direct communication link with a base station. The method also includes configuring the UE for a SL communication link between the UE and a relay UE having a second direct communication link with the base station based on configuration information to enable the relay UE to relay communications between the UE and the base station. The method also includes receiving data from and transmitting data to the base station via both the first direct communication link and the SL communication link in response to the SL communication link being established.

In another aspect, an example method of wireless communication by a relay UE includes establishing a first direct communication link with a base station. The method also includes configuring a SL communication link between the relay UE and a UE having a second direct communication link with the base station, based on configuration information to enable the relay UE to relay communications between the UE and the base station. The method also includes relaying data between the UE and the base station via the SL communication link and the second direct communication link in response to the SL communication link being established.

In another aspect, an example method of wireless communication by a base station includes establishing a first direct communication link with a UE. The method also includes establishing a second direct communication link with a relay UE. The method also includes communicating with the UE and the relay UE to individually configure the UE and the relay UE for a SL communication link between the UE and the relay UE. The method also includes receiving, from the UE via the relay UE, an indication the first direct communication link with the UE has a communication quality below a communication quality threshold. The method also includes receiving data from and transmitting data to the UE on the second direct communication link in response to receiving the indication and in response to the SL communication link being established.

In another aspect, an example method of wireless communication by a UE includes establishing a first direct communication link with a base station. The method also includes configuring a SL communication link with a relay UE having a second direct communication link with the base station. The method also includes determining the first direct communication link with the base station has a communication quality less than a communication quality threshold. The method also includes transmitting, to the base station via the relay UE, an indication the first direct communication link with the UE has the communication quality less than the communication quality threshold. The method also includes configuring the UE for communicating with the base station via the SL communication link between the UE and the relay UE in response to the indication. The method also includes receiving data from and transmitting data to the base station on the SL communication link, via the second direct communication link, in response to the indication and in response to the SL communication link being established.

In another example method of wireless communication by a relay UE includes establishing a first direct communication link with a base station. The method also includes receiving, from a UE having a second direct communication link with the base station, an indication the second direct communication link has a communication quality below a communication quality threshold. The method also includes configuring a SL communication link between the relay UE and the UE in response to the indication to enable the relay UE to relay communications between the UE and the base station. The method also includes relaying data between the UE to the base station via the first direct communication link and the SL communication link in response to the indication and in response to the SL communication link being established.

In another aspect, an example method of wireless communication by a base station includes establishing a direct communication link with a relay UE. The method also includes receiving, from a UE via the relay UE, a request for the base station to communicate with the UE. The method also includes communicating with the UE via the relay UE to individually configure the UE and the relay UE to establish a SL communication link between the UE and the relay UE for the UE to communicate with the base station in response to the request. The method also includes receiving data from and transmitting data to the UE on the direct communication link, and via the SL communication link, in response to the SL communication link being established.

In another aspects, an example method of wireless communication by a UE including discovering a relay UE having a direct communication link with a base station. The method also includes transmitting, to the base station via the relay UE, a request to communicate with the base station. The method also includes configuring the UE to establish a SL communication link between the UE and the relay UE for communicating with the base station in response to the request. The method also includes receiving data from and transmitting data to the base station on the relay UE on the SL communication link, and via the direct communication link, in response to the SL communication link being established.

In another method, an example method of wireless communication by a relay UE includes establishing a direct communication link with a base station. The method also includes receiving, from a UE, a request to communicate with the base station. The method also includes configuring the relay UE to establish a SL communication link between the UE and the relay UE for the UE to communicate with the base station in response to the request. The method also includes relaying data between the UE and the base station on the SL communication link and the direct communication link in response to the SL communication link being established.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
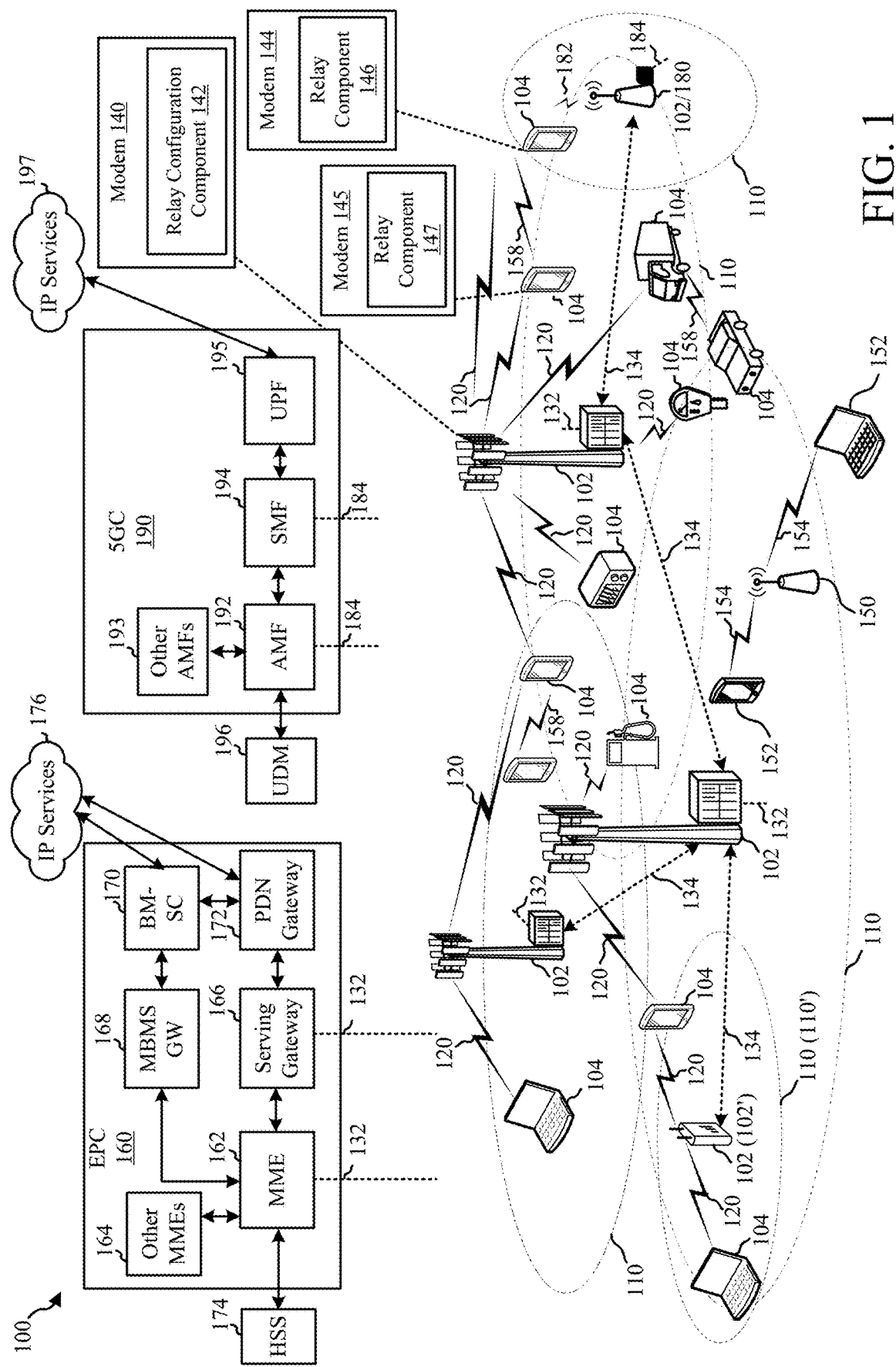
FIG. 1 is a schematic diagram of an example wireless communications system and access network, according to aspects of the present disclosure.

The detailed description, set forth below, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

For fifth generation (5G) new radio (NR) technologies that include millimeter wave (mmW) technologies, communication links may require a line of sight between a base station and a user equipment (UE). Due to line of sight requirements and vulnerabilities of mmW technologies, objects may impair or block these communication links. Some technologies may implement link diversity to allow a UE and a base station to use an uplink (UL) that is different from a downlink (DL) for communication between these devices. With respect to mmW communication issues, however, link diversity does not always solve this problem.

Aspects of the present disclosure describe the use of a relay UE to prevent impaired or blocked communication links between a UE and a base station, such as during mmW communications. In an example, dual connectivity may be used by the UE to simultaneously connect to the base station via two communication link paths, but in this state the UE and the base station regard these connections as one connection (or direction). In other words, dual connectivity allows the UE and the base station to communicate with each other via two different nodes. Dual connectivity is different from carrier aggregation (CA) as dual connectivity uses two simultaneous protocol stacks. In an example, fast link selection or fast link aggregation may be implemented by providing control from the base station. Fast link selection/aggregation may include scheduling of a direct link between the UE and the base station (Uu link) and a sidelink (SL) between the UE and a relay UE. In an example, a relay UE may be used by implementing a layer 2 (L2) relay option as a baseline. Implementing the L2 relay option enables data and control signaling to only go to the L2 protocol layer of the protocol stack, thereby avoiding higher layer processing. The L2 protocol may include the media access control (MAC) layer, the radio link control (RLC) layer, or the packet data convergence protocol (PDCP) layer. Thus, the present disclosure implementing the L2 relay option may save time, processing resources, and power by avoiding the higher layer processing.

In an aspect, an L2-based relay solution may use the radio resource control (RRC) layer of a base station to control the dual connectivity connections. The L2-based relay may use split-bearer PDCP functionality to allow a data bearer to go through either the Uu link or the SL link. This may provide link diversity to improve reliability by using PDCP duplication for better reliability. Further, this may be applied for both signaling and data bearers.

In an example, data may be scheduled based on one or more parameters including, but not limited to, link quality, resource availability, time division duplex (TDD) configurations, transmission (Tx)/receiving (Rx) beam choice, and/or carrier frequency. In an example, the present solution may be advantageous, as a base station may have a better insight than a UE as the base station controls Uu links and can make an educated decision about the scheduling on a SL.

In an aspect, for primary cell (Pcell)/primary secondary cell (PScell), radio link monitoring (RLM) may be performed for each Uu link and SL. Further, radio link failure (RLF) may be declared when both links (Uu and SL) toward UE fail.

Turning now to the figures, examples of techniques for new radio L2 relaying are depicted. It is to be understood that aspects of the figures may not be drawn to scale and are instead drawn for illustrative purposes.

Referring to FIG. 1, a diagram illustrating an example of a wireless communications system and an access network 100 is provided. The wireless communications system (also referred to as a wireless wide area network (WWAN)) includes base stations 102, UEs 104, an Evolved Packet Core (EPC) 160, and a 5G Core (5GC) 190.

The base station 102 may include a modem 140 having a relay configuration component 142 configured to communicate with a UE 104 directly, and indirectly via a relay UE 104, and to individually configure the UE 104 and the relay UE 104 for direct communications and relay communications. Examples of the relay UE 104 include a UE 104 that receive and send communications between another UE 104 and the base station 102, as described in more detail herein.

The UE 104 may include a modem 144 having a relay component 146 configured to receive configuration information from a base station 102 and communicate with the base station 102 via the relay UE 104.

Similarly, the relay UE 104 may include a modem 145 having a relay component 147 configured to receive configuration information from the base station 102 and communicate directly with the base station 102 and the UE 104 to provide a relayed connection for the UE 104 to the base station 102.

In an aspect, the base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). Each of the backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or DL (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a PCell and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
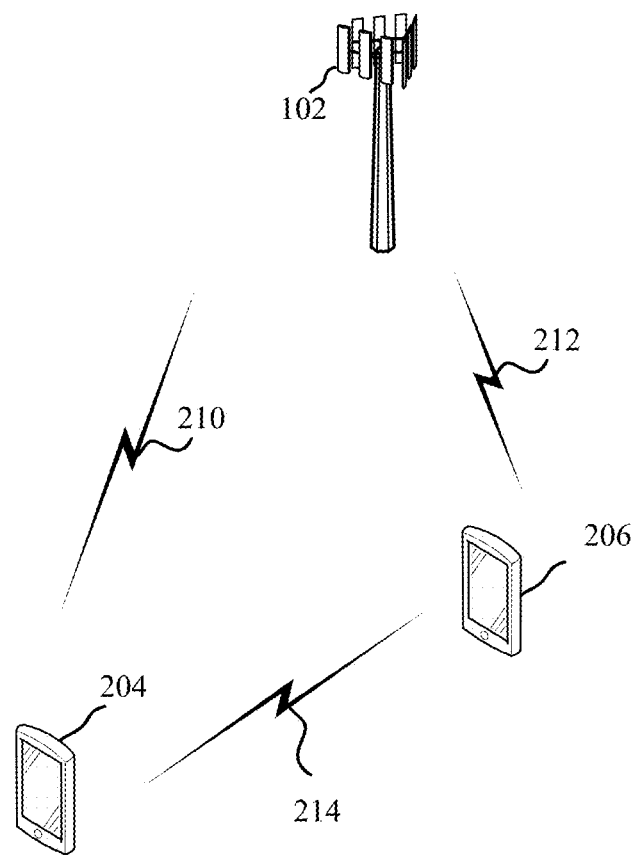
FIG. 2 is a diagram of example communication links between a base station, a UE, and a relay UE, according to aspects of the present disclosure.

Referring to FIG. 2, example communication links between the base station 102, a UE 204, and a relay UE 206 are disclosed. The UE 204 and the relay UE 206 may be examples of the UEs 104 of FIG. 1. As shown by FIG. 2, the UE 204 and the relay UE 206 may each have direct communication links 210, 212 (or Uu communication links), which may be examples of the communication links 120 of FIG. 1, with the base station 102. Further, the UE 204 and the relay UE 206 may have a SL communication link 214, which may be an example of the D2D communication link 158 of FIG. 1.

Conventionally, when the communication link 210 between the base station 102 and the UE 204 is impaired or blocked, different techniques (e.g., link diversity) are used to correct the communication link 210. However, these techniques do not always resolve the issues for unblocking the communication link 210. The present disclosure provides techniques for dual connectivity to allow the UE 204 and the base station 102 to communicate via two different connection links (e.g., (1) direct communication link 210 and (2) direct communication link 212 and SL communication link 214) but regard the connection links as a single connection (e.g., one direction).

In an example, the SL communication link 214 allows the UE 204 to simultaneously communicate with the base station 102 via both the direct communication link 210 and via the relay UE 206 (e.g., via the direct communication link 212 and the SL communication link 214). The relay UE 206 may implement an L2 relay option for base station 102—UE 204 communications via the direct communication link 212 and the SL communication link 214, such that data and control signaling between the base station 102 and the UE 204 only go to the L2 protocol layer of the protocol stack of the relay UE 206, thereby avoiding higher layer processing.

In another example, the SL communication link 214 allows the UE 204 to communicate with the base station 102, via the relay UE 206, when the direct communication link 212 deteriorates or when the UE 204 is not within the coverage of the base station 102.

Figure 3:
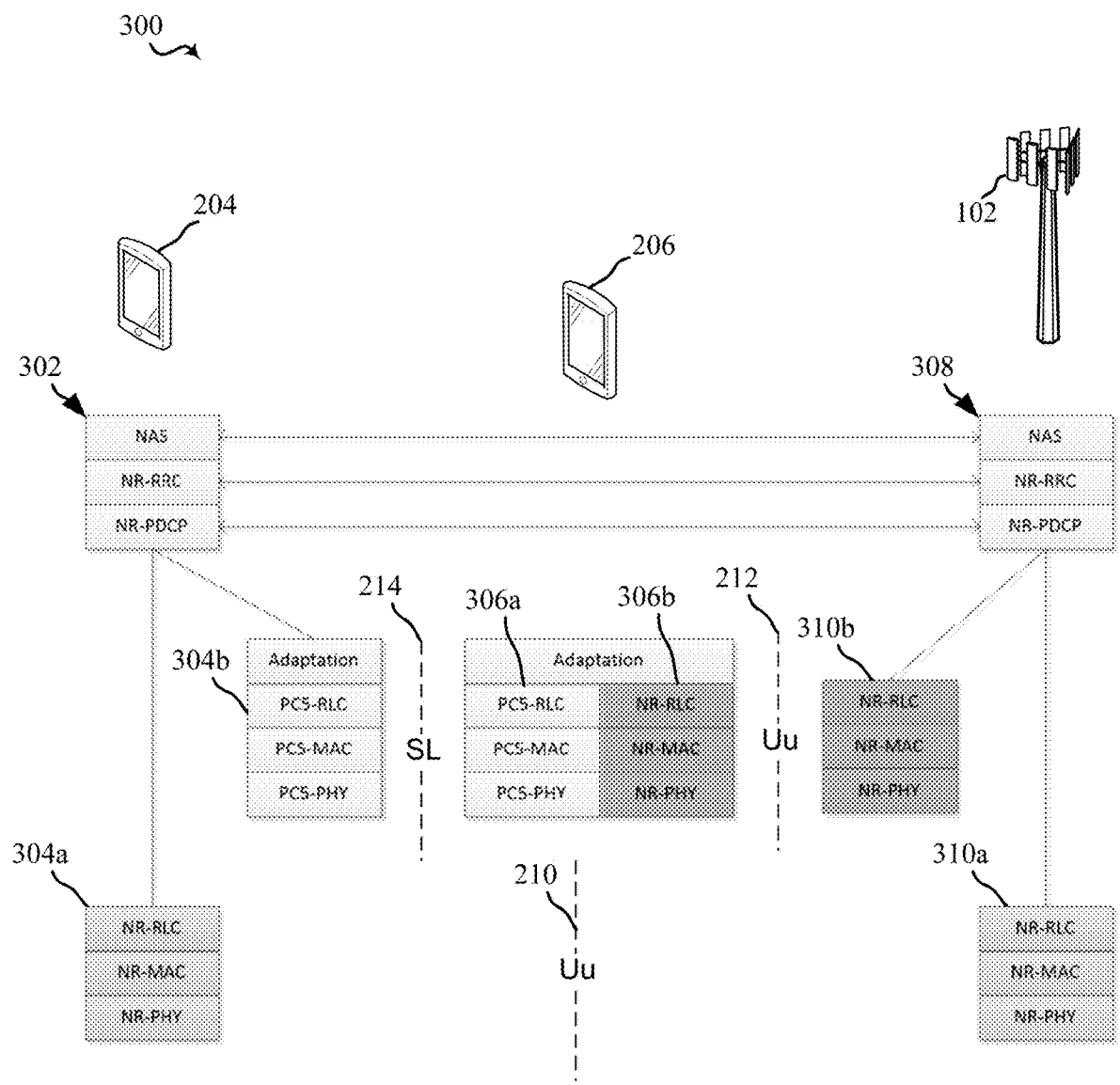
FIG. 3 is a diagram of an example control plane for the base station, the UE, and the relay UE of FIG. 2, according to aspects of the present disclosure.

Referring to FIG. 3, an example control plane 300 for the base station 102, the UE 204, and the relay UE 206 is disclosed. Conventionally, an L2 protocol stack 302 of the UE 204 communicates with an L2 protocol stack 308 of the base station 102 thereby each using a single L2 protocol stack. According to aspects of the present disclosure, each of the base station 102, the UE 204, and the relay UE 206 may include two L2 protocol stacks in order to have dual connectivity between the UE 204 and the base station 102. For example, the UE 206 may use a first L2 protocol stack 304a of the UE 204 to communicate with a first L2 protocol stack 310a of the base station 102 via the direct communication link 210. The UE 206 may also use a second L2 protocol stack 304b of the UE 204 to communicate with a first L2 protocol stack 306a of the relay UE 206 via the SL communication link 214. Further, a second L2 protocol stack 306b of the relay UE 206 and a second L2 protocol stack 308b of the base station 102 may be used to forward communications between the UE 204 to the base station 102 via the direct communication link 212. Thus, the second L2 protocol stack 304b of the UE 204 to communicate with the first L2 protocol stack 306a of the relay UE 206 via the SL communication link 214, and the second L2 protocol stack 306b of the relay UE 206 to communicate with the second L2 protocol stack 308b of the base station 102, defines the L2 relay option, and allows the relay UE 206 to efficiently pass communications between the base station 102 and the UE 204 without full protocol stack operations.

Figure 4:
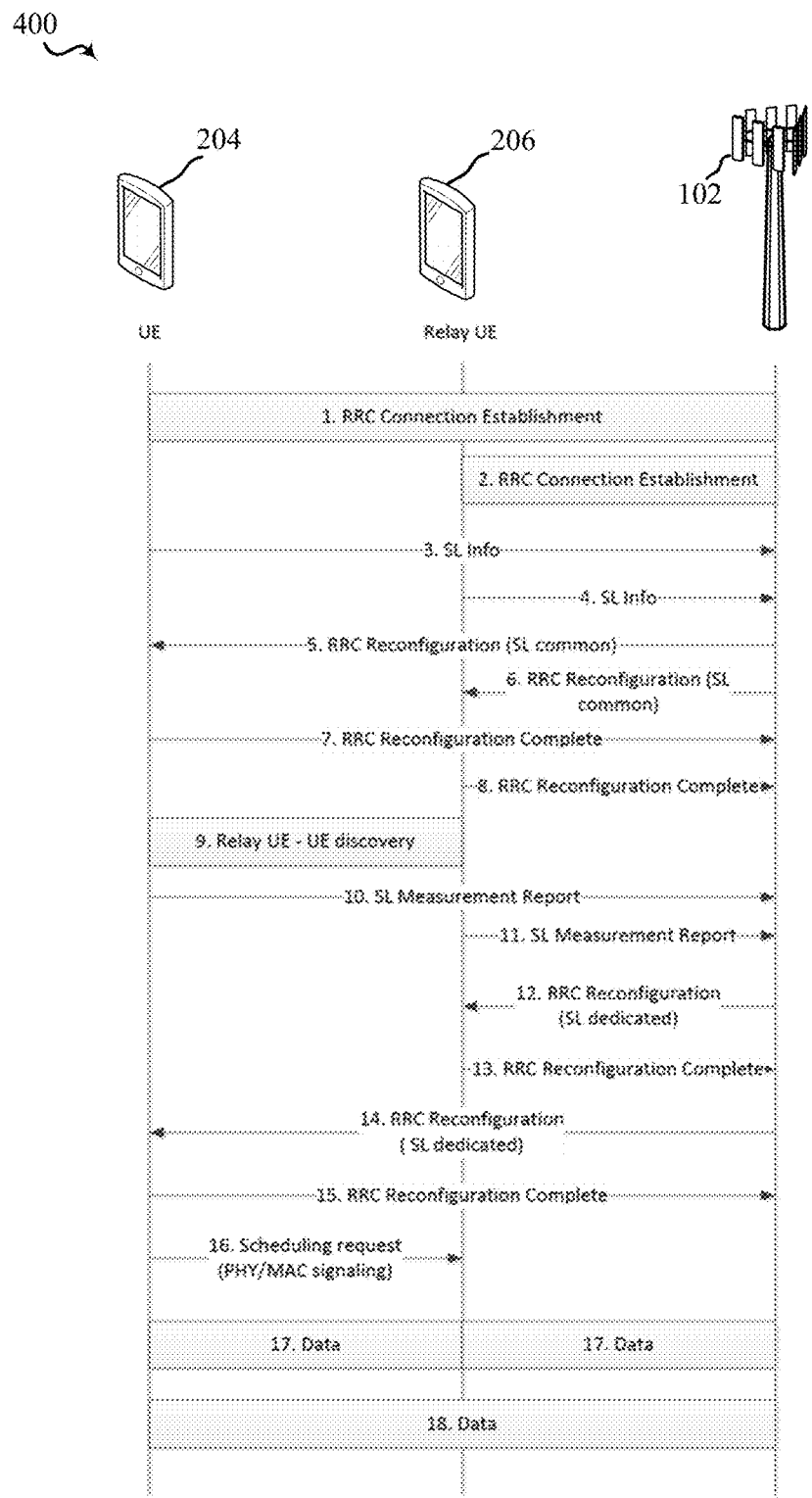
FIG. 4 is a diagram of an example call flow for a control plane when the UE is in coverage of the base station and the relay UE, according to aspects of the present disclosure.

Referring to FIG. 4, an example setup call flow 400 illustrates communications between the UE 204, the relay UE 206, and the base station 102 when the UE 204 is in coverage of both the relay UE 206 and the base station 102. In this example, both the direct communication links 210, 212, and the SL communication link 214 may be utilized for communication between the UE 204 and the base station 102.

In an example, at actions 1 and 2, respectively, the UE 204 and the relay UE 206 may establish individual connections (e.g., direct communication links 210, 212) with the base station 102. At actions 3 and 4, respectively, the UE 204 and the relay UE 206 may also individually send, via the direct communication links 210, 212, indications to the base station 102 that these devices are willing to establish the SL communication link 214. The indications may include SL information including, for example, capabilities information indicating SL settings or properties for each of the UE 204 and the relay UE 206 to establish the SL communication link 214. In response, at actions 5 and 6, respectively, the base station 102 may transmit SL configuration information (e.g., RRC Reconfiguration (SL common)) to each of the UE 204 and the relay UE 206 via the respective direct communication links 210, 212. And, at actions 7 and 8, respectively, the base station 102 may receive confirmations of the configuration information from each of the UE 204 and the relay UE 206.

Based on the configuration information, at action 9, the UE 204 and the relay UE 206 may perform discovery for each other. The UE 204 and the relay UE 206 may also individually send, via the direct communication links 210, 212, SL measurement reports to the base station 102 at actions 10 and 11, respectively. In response to the SL measurement reports, at actions 12 and 14, respectively, the base station 102 may transmit SL configuration information (e.g., RRC Reconfiguration (SL Dedicated)) to each of the UE 204 and the relay UE 206 via the respective direct communication links 210, 212. Further, at actions 13 and 15, respectively, the base station 102 may receive confirmations of the SL configuration information from each of the UE 204 and the relay UE 206.

Once the SL configuration information is confirmed, at action 16, the UE 204 may transmit a scheduling request to the relay UE 206 via the configured SL communication link 214. Further, at actions 17 and 18, the UE 204 may now transmit data to and receive data from the base station 102 via both the direct communication link 210 and the SL communication link 214.

Figure 5:
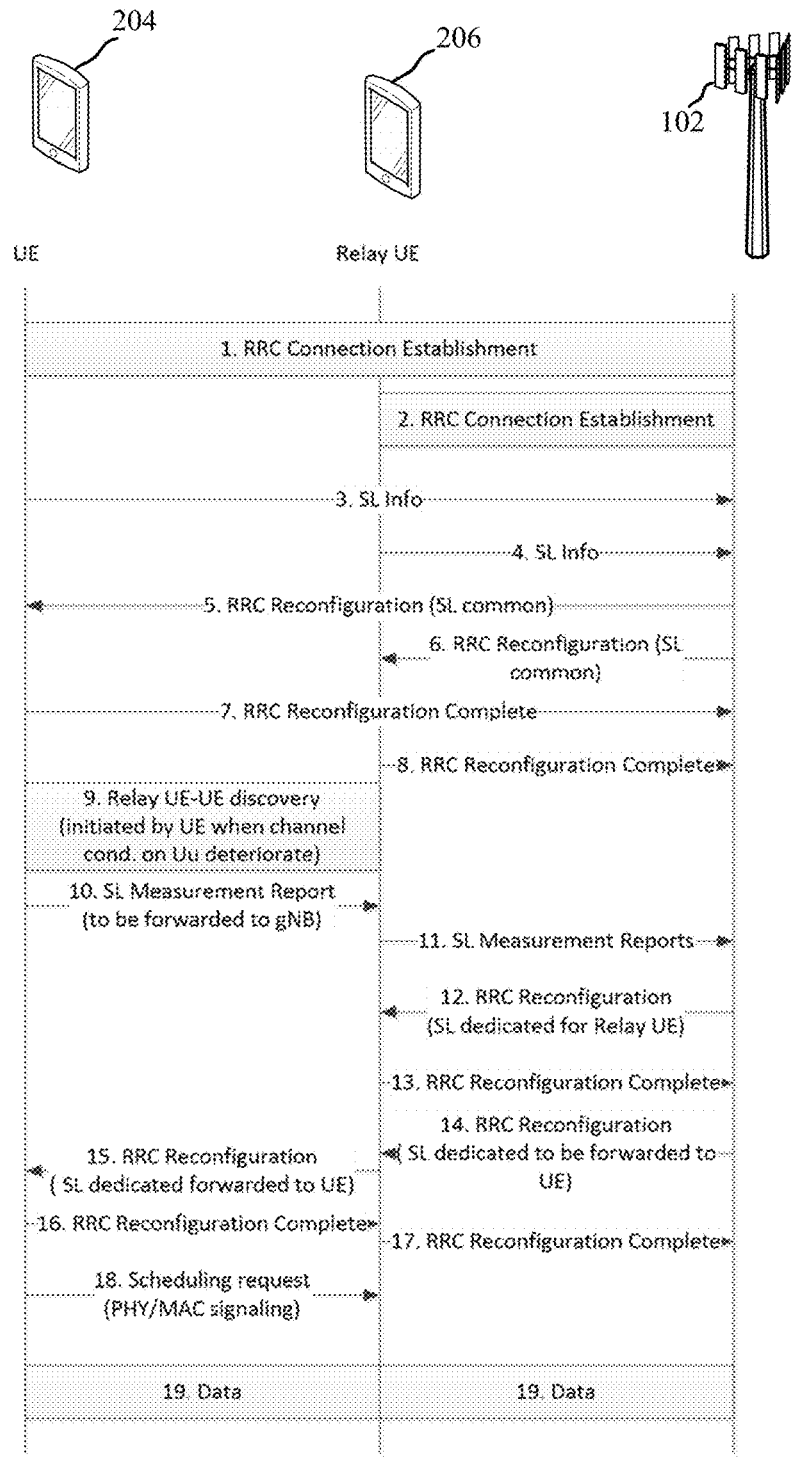
FIG. 5 is a diagram of another example call flow for a control plane when the UE is in coverage of the base station and the relay UE, according to aspects of the present disclosure.

Referring to FIG. 5, an example setup call flow 500 illustrates communications between the UE 204, the relay UE 204, and the base station 102 when the UE 204 is in coverage of both the relay UE 206 and the base station 102 and when the direct communication link 210 deteriorates. In this example, SL communication link 214 may be utilized for communication between the UE 204 and the base station 102 due to the deterioration of the direct communication link 210.

In an example, at actions 1 and 2, respectively, the UE 204 and the relay UE 206 may establish individual connections (e.g., direct communication links 210, 212) with the base station 102. At actions 3 and 4, respectively, the UE 204 and the relay UE 206 may also individually send, via the direct communication links 210, 212, indications to the base station 102 that these devices are willing to establish the SL communication link 214. The indications may include SL information including, for example, capabilities information indicating SL settings or properties for each of the UE 204 and the relay UE 206 to establish the SL communication link 214. In response, at actions 5 and 6, respectively, the base station 102 may transmit SL configuration information (e.g., RRC Reconfiguration (SL Common)) to each of the UE 204 and the relay UE 206 via the respective direct communication links 210, 212. Further, at actions 7 and 8, respectively, the base station 102 may receive confirmations of the configuration information from each of the UE 204 and the relay UE 206.

Based on the configuration information, at action 9, the UE 204 may initiate discovery of the relay UE 206 when the direct communication link 210 between the UE 204 and the base station 102 deteriorates. The UE 204 may monitor, for example, one or more parameters of the direct communication link 210 and based on the parameters determine that the channel condition on the direct communication link 210 is deteriorated. The parameters may include, but are not limited to, a channel condition, a packet error rate, or a received signal strength of the direct communication link 210. In this case, the UE 204 may communicate with the base station 102 via the relay UE 206 to configure data communications between the UE 204 and the base station 102. For example, after discovery, the UE 204 and the base station 102 may transmit packets to each other, via the SL communication links 214 and the direct communication link 212. The UE 204 and the relay UE 206 may individually send, via the direct communication links 210, 212, SL measurement reports to the base station 102 at actions 10 and 11, respectively. In response to the SL measurement reports, at actions 12 and 14, respectively, the base station 102 may transmit SL configuration information (e.g., RRC Reconfiguration (SL Dedicated)) to each of the UE 204 and the relay UE 206 via the respective direct communication links 210, 212. Further, at actions 13 and 15, respectively, the base station 102 may receive confirmations of the SL configuration information from each of the UE 204 and the relay UE 206. In this example, the relay UE 206 does not interpret packets transmitted between the UE 204 and the base station 102. Instead, the relay UE 206 merely forwards the packets to respective devices (e.g., UE 204 or base station 102).

Once the SL configuration information is confirmed, at actions 16 and 17, the UE 204 may transmit a scheduling request to the relay UE 206. At action 18, the UE 204 may now transmit data to and receive data from the base station 102 via the SL communication link 214, at action 19.

Figure 6:
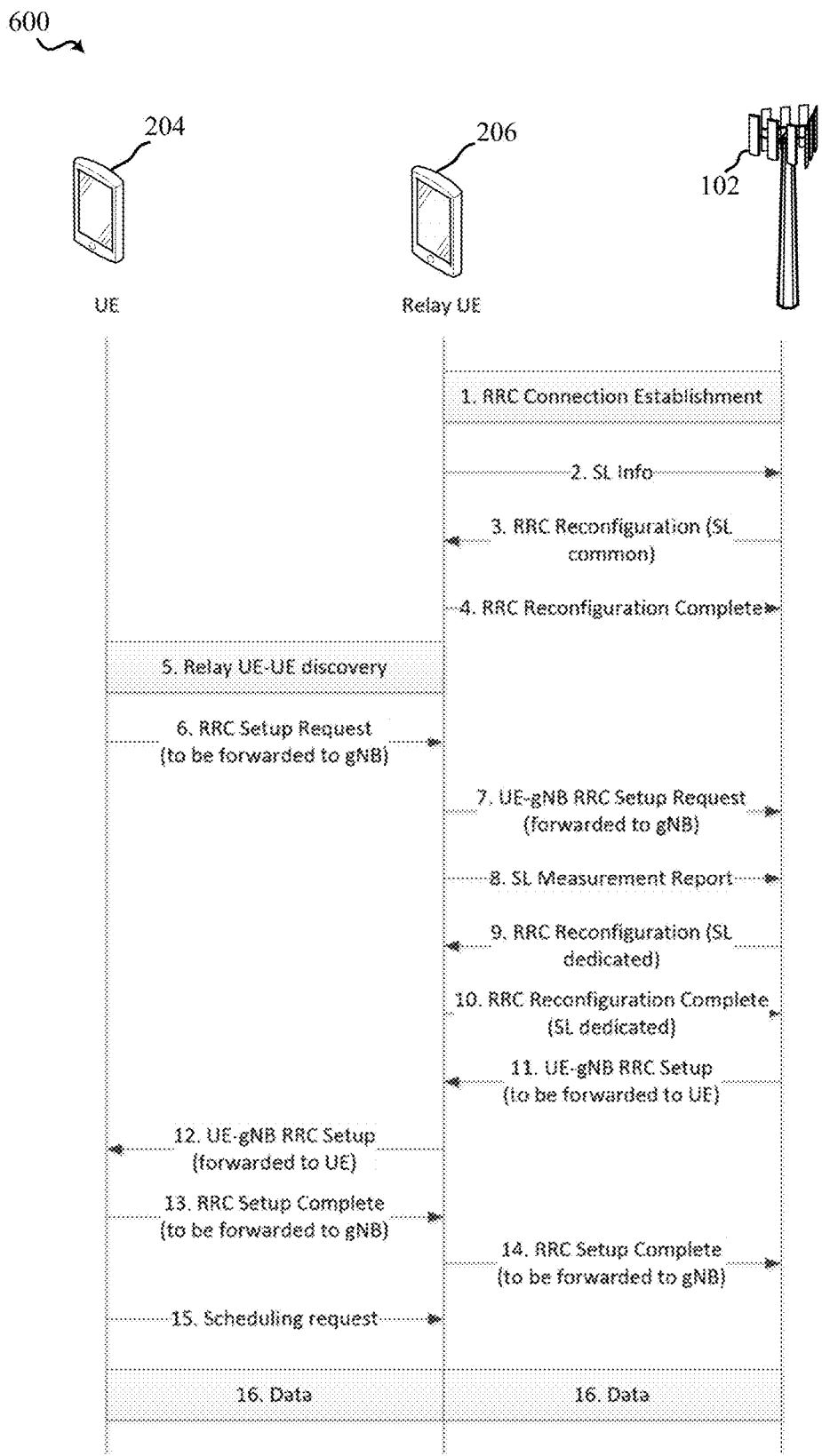
FIG. 6 is a diagram of an example call flow for a control plane when the UE is in coverage of the relay UE but not the base station, according to aspects of the present disclosure.

Referring to FIG. 6, an example setup call flow 600 illustrates communications between the UE 204, the relay UE 204, and the base station 102 when the UE 204 is in coverage of the relay UE 206 but not in the coverage of the base station 102. In this example, the SL communication link may be utilized for communication between the UE 204 and the base station 102.

In an example, at action 1, the relay UE 206 may establish an individual connection (e.g., direct communication links 212) with the base station 102. At action 2, the relay UE 206 may also individually send, via the direct communication links 212, an indication to the base station 102 that the relay UE 206 is willing to establish the SL communication link 214. The indication may include SL information including, for example, capabilities information indicating SL settings or properties for the relay UE 206 to establish the SL communication link 214. In response, at action 3, the base station 102 may transmit SL configuration information (e.g., RRC Reconfiguration (SL Common)) to the relay UE 206 via the direct communication link 212, and, at action 4, the base station 102 may receive a confirmation of the SL configuration information from the relay UE 206.

In this case, the UE 204 may communicate with the base station 102 via the relay UE 206 to configure data communications between the UE 204 and the base station 102. At action 5, the UE 204 and the relay UE 206 may perform a discovery procedure for communicating with each other on a SL communication link. For example, after discovery, the UE 204 and the base station 102 may transmit packets to each other, via the SL communication links 214 and the direct communication link 212. The packets may include SL measurement reports, configuration information, and confirmation information. In this example, the relay UE 206 does not interpret packets transmitted between the UE 204 and the base station 102. Instead, the relay UE 206 merely forwards the packets to the respective devices. For instance, at action 6, the UE 204 may send a setup request intended for the base station 102 to the relay UE 206 via the SL communication link 214. In response, at action 7, the relay UE 206 may forward the setup request to the base station 102 via the direct communication link 212. Additionally, at action 8, the relay UE 206 may send a SL measurement report, e.g., for SL communication link 214 with the UE 204, to the base station 102. In response, at action 9, the base station 102 may send SL configuration information (e.g., RRC Reconfiguration (SL Dedicated) to the relay UE 206. At actions 10 and 11, respectively, the relay UE 206 may send a reconfiguration complete message to the base station 102, and in response may receive a setup configuration message (e.g., UE-gNB RRC Setup) to be forwarded to the UE 204 via the SL communication link 214. At actions 12 and 13, respectively, the relay UE 206 may forward the setup configuration to the UE 204 and, in response, receive a setup complete message (e.g., RRC Setup Complete) from the UE 204 to be forwarded to the base station 102. The relay UE 206 may then forward the setup complete message to the base station 102.

Once the configuration information is confirmed, at action 15, the UE 204 may transmit a scheduling request to the relay UE 206. At action 16, the UE 204 may now transmit data to and receive data from the base station 102 via the SL communication link 214 with the relay UE 206.

Figure 7:
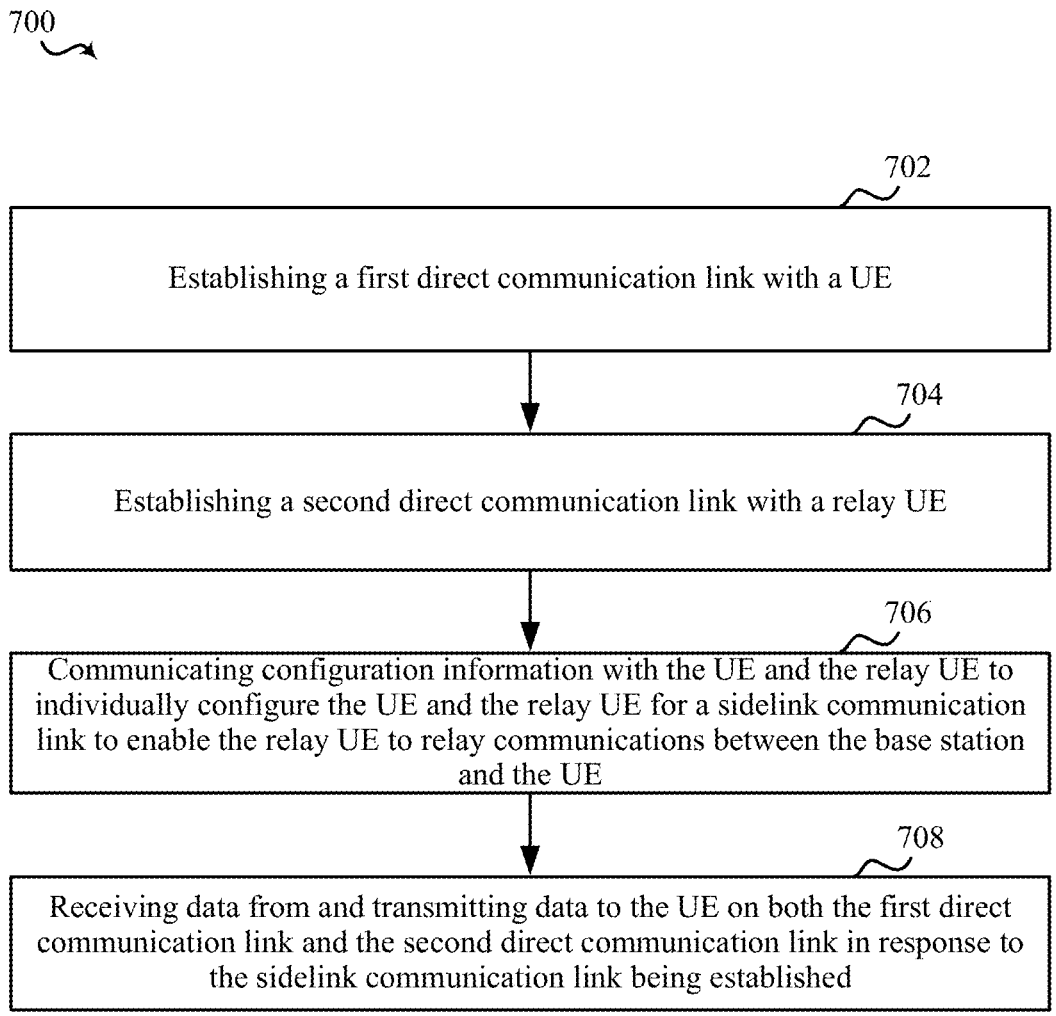
FIG. 7-9 are flowcharts of example methods of wireless communications by a base station, according to aspects of the present disclosure.
Figure 8:
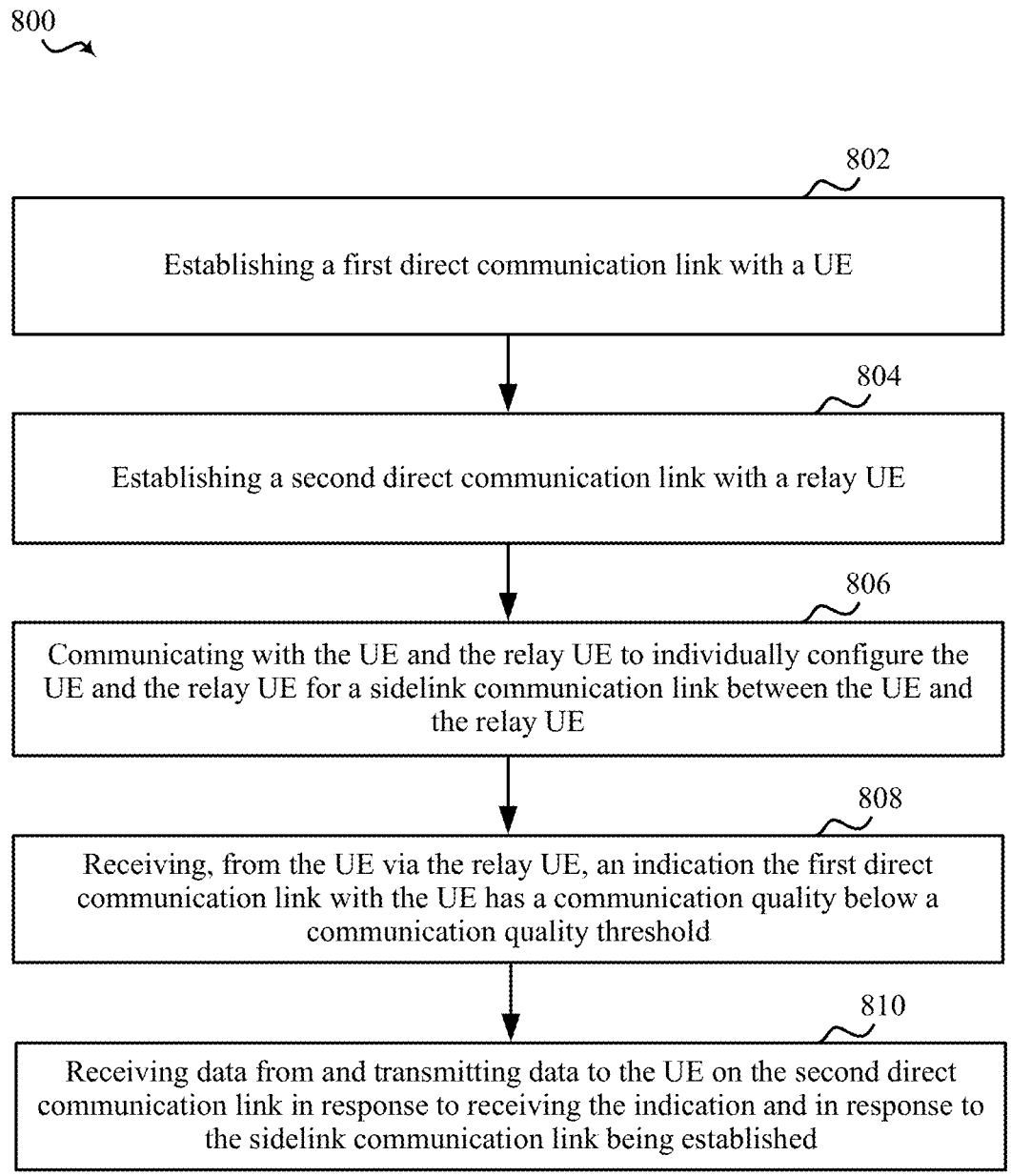
Figure 9:
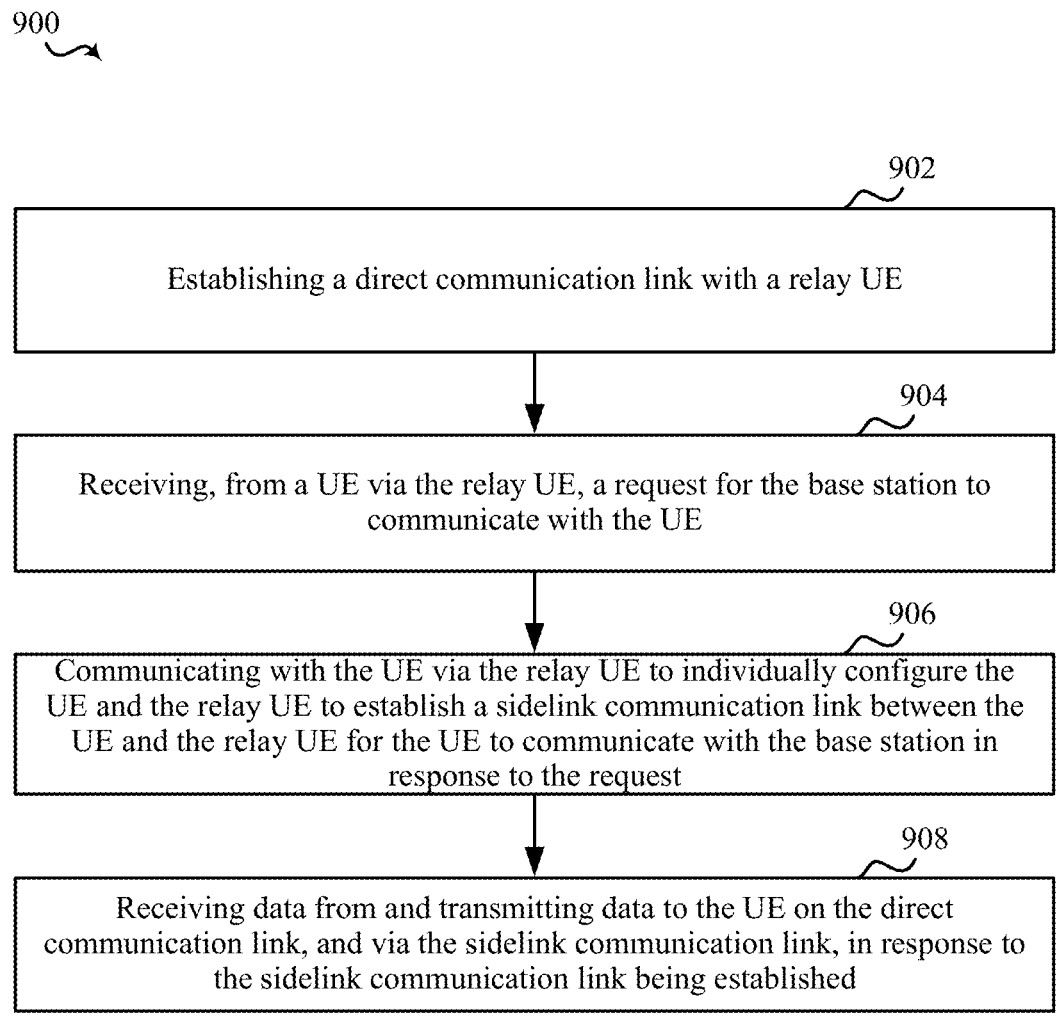

Referring to FIGS. 7-9, example methods of wireless communications are disclosed to improve connectivity between the base station 102 and the UE 204, which has the SL communication link 214 with the relay UE 206. The methods 700, 800 and 900 may be performed by the base station 102 of FIGS. 1 and 2 along with any of the components (see e.g., FIG. 10) of the base station 102. For example, the methods 700, 800 and 900 may be performed by one or more of the a processor 1012, a transceiver 1002, the modem 140, the relay configuring component 142, and/or one or more additional components/subcomponents of the base station 102.

Turning to FIG. 7, the method 700 may be used by the base station when the UE 204 is in coverage of the base station 102 and the relay UE 206, and a direct communication link 210 and a relay link (e.g., direct communication link 212 between base station 102 and relay UE 206 and SL communication link 214 between relay UE 206 and UE 204) both may be used to communicate with the UE 204 to provide dual connectivity and avoid communication failures. Examples of the operations of the method 700 are described in relation to FIG. 4.

As an example, at 702, the method 700 may include establishing a first direct communication link with a UE. For example, one or more of the processor 1012, the transceiver 1002, the modem 140, the relay configuring component 142 and/or one or more components/subcomponents of the base station 102 may be configured to establish the direct communication link 210 with the UE 204. Thus, the processor 1012, the transceiver 1002, the modem 140, the relay configuring component 142, and/or one or more components/subcomponents of the base station 102 may define the means for establishing the direct communication link 210 with the UE 204. In an example, the base station 102 and the UE 204 may establish the direct communication link 210 through any conventional means, as described by actions 1 and 2 of FIG. 4.

At 704, the method 700 may include establishing a second direct communication link with a relay UE. For example, one or more of the processor 1012, the transceiver 1002, the modem 140, the relay configuring component 142 and/or one or more components/subcomponents of the base station 102 may be configured to establish the direct communication link 212 with a relay UE 206. Thus, the processor 1012, the transceiver 1002, the modem 140, the relay configuring component 142, and/or one or more components/subcomponents of the base station 102 may define the means for establishing the direct communication link 212 with a relay UE 206. In an example, the base station 102 and the relay UE 206 may establish the direct communication link 210 through any conventional means.

At 706, the method 700 may include communicating configuration information with the UE and the relay UE to individually configure the UE and the relay UE for a SL communication link to enable the relay UE to relay communications between the base station and the UE. For example, one or more of the processor 1012, the transceiver 1002, the modem 140, the relay configuring component 142 and/or one or more components/subcomponents of the base station 102 may be configured to communicate configuration information with the UE 204 and the relay UE 206 to individually configure the UE 204 and the relay UE 206 for the SL communication link 214 to enable the relay UE 206 to relay communications between the base station 102 and the UE 204. Thus, the processor 1012, the transceiver 1002, the modem 140, the relay configuring component 142, and/or one or more components/subcomponents of the base station 102 may define the means for communicating configuration information with the UE 204 and the relay UE 206 to individually configure the UE 204 and the relay UE 206 for the SL communication link 214 to enable the relay UE 206 to relay communications between the base station 102 and the UE 204. In an example, the configuration information may include the SL configuration information described by actions 5 and 6 of FIG. 4, or the SL configuration information of actions 12 and 14 of FIG. 4.

At 708, the method 700 may include receiving data from and transmitting data to the UE on both the first direct communication link and the second direct communication link in response to the SL communication link being established. For example, one or more of the processor 1012, the transceiver 1002, the modem 140, the relay configuring component 142 and/or one or more components/subcomponents of the base station 102 may be configured to receive data from and transmitting data to the UE 204 on both the direct communication links 210 and 212 in response to the SL communication link 214 being established. Thus, the processor 1012, the transceiver 1002, the modem 140, the relay configuring component 142, and/or one or more components/subcomponents of the base station 102 may define the means for receiving data from and transmitting data to the UE 204 on both the direct communication links 210 and 212 in response to the SL communication link 214 being established. In an example, the base station 102 may communicate with the UE 204 via (1) the direct communication link 210 and (2) relay UE 206 using the direct communication links 212 and the SL communication link 214, as described by actions 17 and 18 of FIG. 4.

Turning to FIG. 8, the method 800 may be used by the base station 102 when the UE 204 is in coverage of the base station 102 and the relay UE 206, and the UE 104 decides to use the relay connection (e.g., direct connection between the base station 102 and the relay UE 206, which has a SL communication with the UE 204) in response to the direct communication link 210 between the UE 204 and the base station 102 deteriorating, to avoid communication failures. Examples of the operations of the method 800 are described in relation to FIG. 5.

In an example, at 802, the method 800 may include establishing a first direct communication link with a UE. For example, one or more of the processor 1012, the transceiver 1002, the modem 140, the relay configuring component 142 and/or one or more components/subcomponents of the base station 102 may be configured to establish the direct communication link 210 with the UE 204. Thus, the processor 1012, the transceiver 1002, the modem 140, the relay configuring component 142, and/or one or more components/subcomponents of the base station 102 may define the means for establishing the direct communication link 210 with the UE 204. In an example, the base station 102 and the UE 204 may establish the direct communication link 210 through any conventional means.

At 804, the method 800 may include establishing a second direct communication link with a relay UE. For example, one or more of the processor 1012, the transceiver 1002, the modem 140, the relay configuring component 142 and/or one or more components/subcomponents of the base station 102 may be configured to establish the direct communication link 212 with the relay UE 206. Thus, the processor 1012, the transceiver 1002, the modem 140, the relay configuring component 142, and/or one or more components/subcomponents of the base station 102 may define the means for establishing the direct communication link 212 with the relay UE 206. In an example, the base station 102 and the relay UE 206 may establish the direct communication link 210 through any conventional means.

At 806, the method 800 may include communicating with the UE and the relay UE to individually configure the UE and the relay UE for a SL communication link between the UE and the relay UE. For example, one or more of the processor 1012, the transceiver 1002, the modem 140, the relay configuring component 142 and/or one or more components/subcomponents of the base station 102 may be configured to communicate with the UE 204 and the relay UE 206 to individually configure the UE 204 and the relay UE 206 for the SL communication link 214 between the UE 204 and the relay UE 206. Thus, the processor 1012, the transceiver 1002, the modem 140, the relay configuring component 142, and/or one or more components/subcomponents of the base station 102 may define the means for communicating with the UE 204 and the relay UE 206 to individually configure the UE 204 and the relay UE 206 for the SL communication link 214 between the UE 204 and the relay UE 206. In an example, the base station 102 may provide the SL configuration information of actions 3 and 4 of FIG. 5.

At 808, the method 800 may include receiving, from the UE via the relay UE, an indication the first direct communication link with the UE has a communication quality below a communication quality threshold. For example, one or more of the processor 1012, the transceiver 1002, the modem 140, the relay configuring component 142 and/or one or more components/subcomponents of the base station 102 may be configured to receive, from the UE 204 via the relay UE 206, an indication the direct communication link 210 with the UE 204 has a communication quality below a communication quality threshold. Thus, the processor 1012, the transceiver 1002, the modem 140, the relay configuring component 142, and/or one or more components/subcomponents of the base station 102 may define the means for receiving, from the UE 204 via the relay UE 206, an indication the direct communication link 210 with the UE 204 has a communication quality below a communication quality threshold. For example, the base station 102 may receive an SL measurement report of actions 10 and 11 of FIG. 5 which indicate that the direct communication link 210 has a communication quality below a threshold.

At 810, the method 800 may include receiving data from and transmitting data to the UE on the second direct communication link in response to receiving the indication and in response to the SL communication link being established. For example, one or more of the processor 1012, the transceiver 1002, the modem 140, the relay configuring component 142 and/or one or more components/subcomponents of the base station 102 may be configured to receive data from and transmit data to the UE 204 on the direct communication link 212 in response to receiving the indication and in response to the SL communication link 214 being established. Thus, the processor 1012, the transceiver 1002, the modem 140, the relay configuring component 142, and/or one or more components/subcomponents of the base station 102 may define the means for receiving data from and transmitting data to the UE 204 on the direct communication link 212 in response to receiving the indication and in response to the SL communication link 214 being established. For example, the base station 102 and the UE 204 may communicate via the relay UE 206 using the direct communication link 212 and the SL communication link 214.

Turning to FIG. 9, the method 900 may be used by the base station when the UE is in coverage of the relay UE, and the UE decides to use a relay connection (e.g., a direct connection between the base station 102 and the relay UE 206, which has a SL communication link with the UE 204) to enable relayed communications with the base station and avoid communication failures. Examples of the operations of the method 900 are described in relation to FIG. 6.

In an example, at 902, the method 900 may include establishing a direct communication link with a relay UE. For example, one or more of the processor 1012, the transceiver 1002, the modem 140, the relay configuring component 142 and/or one or more components/subcomponents of the base station 102 may be configured to establish the direct communication link 212 with the relay UE 206. Thus, the processor 1012, the transceiver 1002, the modem 140, the relay configuring component 142, and/or one or more components/subcomponents of the base station 102 may define the means for establishing the direct communication link 212 with the relay UE 206. In an example, the base station 102 and the relay UE 206 may establish the direct communication link 212 through any conventional means.

At 904, the method 900 may include receiving, from a UE via the relay UE, a request for the base station to communicate with the UE. For example, one or more of the processor 1012, the transceiver 1002, the modem 140, the relay configuring component 142 and/or one or more components/subcomponents of the base station 102 may be configured to receive, from the UE 204 via the relay UE 206, a request for the base station 102 to communicate with the UE 204. Thus, the processor 1012, the transceiver 1002, the modem 140, the relay configuring component 142, and/or one or more components/subcomponents of the base station 102 may define the means for receiving, from the UE 204 via the relay UE 206, a request for the base station 102 to communicate with the UE 204. An example of the request for the base station 102 to communicate with the UE 204 may include the setup request described by action 6 of FIG. 6.

At 906, the method 900 may include communicating with the UE via the relay UE to individually configure the UE and the relay UE to establish a SL communication link between the UE and the relay UE for the UE to communicate with the base station in response to the request. For example, one or more of the processor 1012, the transceiver 1002, the modem 140, the relay configuring component 142 and/or one or more components/subcomponents of the base station 102 may be configured to communicate with the UE 204 via the relay UE 206 to individually configure the UE 204 and the relay UE 206 to establish the SL communication link 214 between the UE 204 and the relay UE 206 for the UE 204 to communicate with the base station 102 in response to the request. Thus, the processor 1012, the transceiver 1002, the modem 140, the relay configuring component 142, and/or one or more components/subcomponents of the base station 102 may define the means for communicating with the UE 204 via the relay UE 206 to individually configure the UE 204 and the relay UE 206 to establish the SL communication link 214 between the UE 204 and the relay UE 206 for the UE 204 to communicate with the base station 102 in response to the request. For example, the base station 102 may send SL configuration information to the relay UE 206 and/or setup configuration information of actions 9 and 11 of FIG. 6 to the relay UE 206 and the UE 204, respectively, for configuring the relay UE 206 and the UE 204.

At 908, the method 900 may include receiving data from and transmitting data to the UE on the direct communication link, and via the SL communication link, in response to the SL communication link being established. For example, one or more of the processor 1012, the transceiver 1002, the modem 140, the relay configuring component 142 and/or one or more components/subcomponents of the base station 102 may be configured to receive data from and transmit data to the UE 204 on the direct communication link 212, and via the SL communication link 214, in response to the SL communication link 214 being established. Thus, the processor 1012, the transceiver 1002, the modem 140, the relay configuring component 142, and/or one or more components/subcomponents of the base station 102 may define the means for receiving data from and transmitting data to the UE 204 on the direct communication link 212, and via the SL communication link 214, in response to the SL communication link 214 being established. For example, the base station 102 may communicate with the UE 204 via the relay UE 206, as described by action 16 of FIG. 6.

Figure 10:
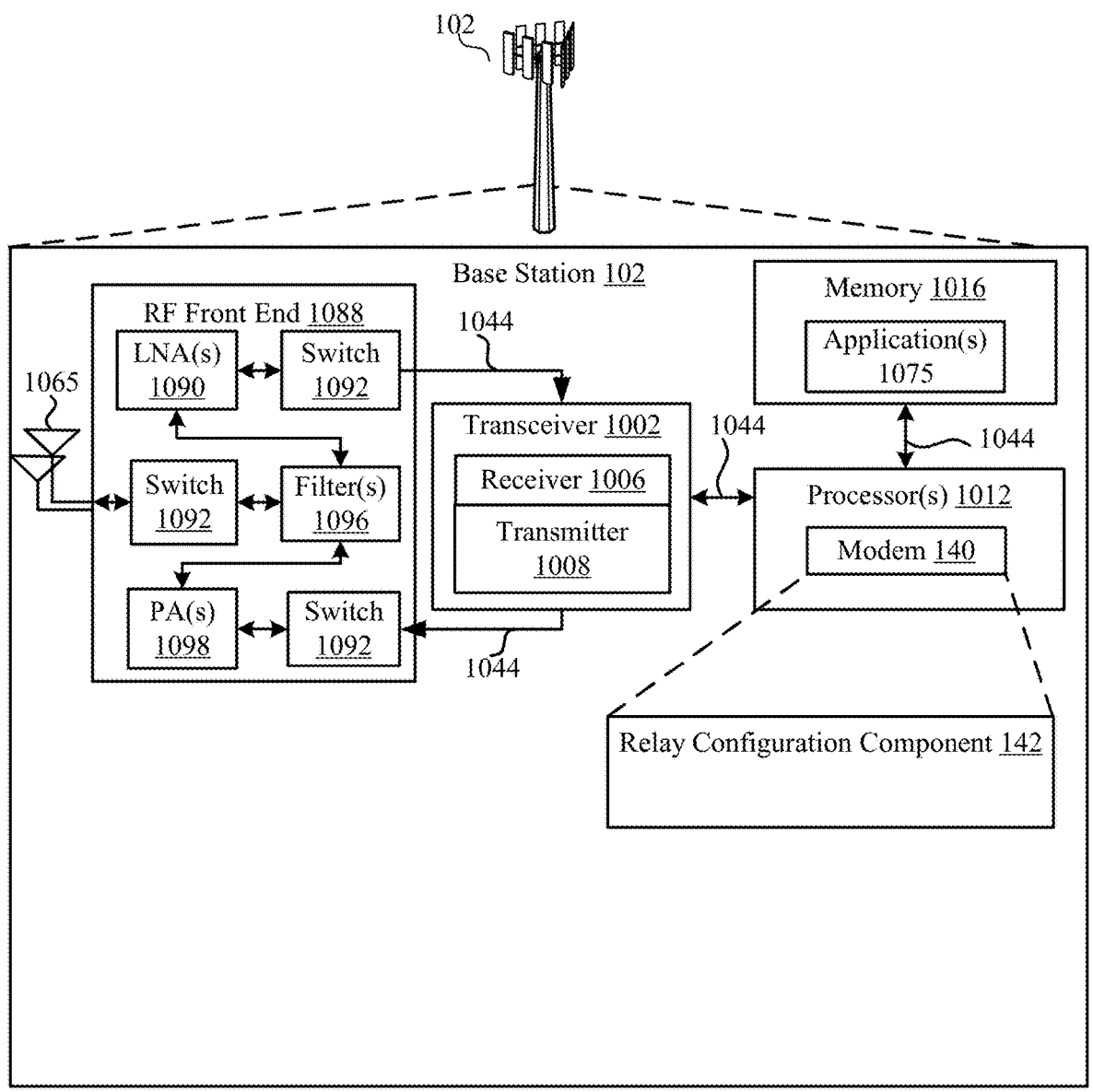
FIG. 10 is a schematic diagram of an example of the base station of FIG. 1, according to aspects of the present disclosure.

Referring to FIG. 10, one example of an implementation of the base station 102 may include a variety of components, some of which have already been described above, but including components such as one or more processors 1012, memory 1016, and transceiver 1002 in communication via one or more buses 1044, which may operate in conjunction with the modem 140 to enable one or more of the functions of the methods 700, 800, and 900 described herein. The one or more processors 1012, modem 140, memory 1016, the transceiver 1002, RF front end 1088 and one or more antennas 1065, may be configured to support voice and/or data calls (simultaneously or non-simultaneously) in one or more radio access technologies.

In an aspect, the one or more processors 1012 may include the modem 140 that uses one or more modem processors. The various functions related to the relay configuring component 144 may be included in the modem 140 and/or the processors 1012 and, in an aspect, may be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with the transceiver 1002. In other aspects, some of the features of the one or more processors 1012 and/or the modem 140 may be performed by the transceiver 1002.

Also, the memory 1016 may be configured to store data used herein and/or local versions of applications 1075 or the relay configuration component 142 and/or one or more of its subcomponents being executed by the at least one processors 1012. The memory 1016 may include any type of computer-readable medium usable by a computer or the at least one processor 1012, such as random access memory (RAM), read only memory (ROM), tapes, magnetic discs, optical discs, volatile memory, non-volatile memory, and any combination thereof. In an aspect, for example, the memory 1016 may be a non-transitory computer-readable storage medium that stores one or more computer-executable codes defining the relay configuration component 142 and/or one or more of its subcomponents, and/or data associated therewith, when the base station 102 is operating the at least one processor 1012 to execute the relay configuration component 142 and/or one or more of its subcomponents.

The transceiver 1002 may include at least one receiver 1006 and at least one transmitter 1008. The receiver 1006 may include hardware, firmware, and/or software code executable by a processor for receiving data, the code comprising instructions and being stored in a memory (e.g., computer-readable medium). The receiver 1006 may be, for example, a radio frequency (RF) receiver. In an aspect, the receiver 1006 may receive signals transmitted by at least one of the UE 104, UE 204, or relay UE 206. Additionally, the receiver 1006 may process such received signals, and also may obtain measurements of the signals, such as, but not limited to, Ec/Io, SNR, RSRP, RSSI, etc. The transmitter 1008 may include hardware, firmware, and/or software code executable by a processor for transmitting data, the code comprising instructions and being stored in a memory (e.g., computer-readable medium). A suitable example of the transmitter 1008 may include, but is not limited to, an RF transmitter. The transceiver 1002, receiver 1006, and/or transmitter 1008 may be configured to operate in mmW frequencies and/or near mmW frequencies.

Moreover, in an aspect, the base station 102 may include the RF front end 1088, which may operate in communication with one or more antennas 1065 and the transceiver 1002 for receiving and transmitting radio transmissions, for example, wireless communications transmitted by at least one of the UE 104, UE 204, relay UE 206, or wireless transmissions transmitted by the base station 102. The RF front end 1088 may be connected to the one or more antennas 1065 and may include one or more low-noise amplifiers (LNAs) 1090, one or more switches 1092, one or more power amplifiers (PAs) 1098, and one or more filters 1096 for transmitting and receiving RF signals.

In an aspect, the LNA 1090 may amplify a received signal at a desired output level. In an aspect, each of the LNAs 1090 may have a specified minimum and maximum gain values. In an aspect, the RF front end 1088 may use the one or more switches 1092 to select a particular LNA 1090 and its specified gain value based on a desired gain value for a particular application.

The one or more PA(s) 1098 may be used by the RF front end 1088 to amplify a signal for an RF output at a desired output power level. In an aspect, each of the PAs 1098 may have specified minimum and maximum gain values. In an aspect, the RF front end 1088 may use the one or more switches 1092 to select a particular PA 1098 and its specified gain value based on a desired gain value for a particular application.

Also, for example, the one or more filters 1096 may be used by the RF front end 488 to filter a received signal to obtain an input RF signal. Similarly, in an aspect, for example, a respective filter 1096 may be used to filter an output from a respective PA 1098 to produce an output signal for transmission. In an aspect, each of the filters 1096 may be connected to a specific LNA 1090 and/or PA 1098. In an aspect, the RF front end 1088 may use the one or more switches 1092 to select a transmit or receive path using a specified filter 1096, LNA 1090, and/or PA 1098, based on a configuration as specified by the transceiver 1002 and/or the processor 1012.

As such, the transceiver 1002 may be configured to transmit and receive wireless signals through the one or more antennas 1065 via the RF front end 1088. In an aspect, the transceiver 1002 may be tuned to operate at specified frequencies such that the base station 102 may communicate with, for example, one or more of the UE 104, UE 204, relay UE 206, or one or more cells associated with one or more of the base stations 102. In an aspect, for example, the modem 140 may configure the transceiver 1002 to operate at a specified frequency and power level based on the base station configuration of the base station 102 and the communication protocol used by the modem 140.

In an aspect, the modem 140 may be a multiband-multimode modem, which may process digital data and communicate with the transceiver 1002 such that the digital data is sent and received using the transceiver 1002. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the base station 102 (e.g., RF front end 1088, transceiver 1002) to enable transmission and/or reception of signals from the network based on a specified modem configuration. In an aspect, the modem configuration may be based on the mode of the modem 140 and the frequency band in use. In another aspect, the modem configuration may be based on base station configuration information associated with the base station 102 as provided by the network during cell selection and/or cell reselection.

Referring to FIGS. 11-16, example methods of wireless communications are disclosed. The methods 1100, 1200, and 1300, may be performed by the UE 104 (including UE 204 of FIG. 2) and methods 1400, 1500, and 1600 may be performed by the relay UE 104 (including the relay UE 206 of FIG. 2) along with any of the components (see e.g., FIG. 17) of the UE 104. For example, the methods 1100, 1200, and 1300, may be performed by one or more of a processor 1712, a transceiver 1702, the modem 144, the relay component 146, and/or one or more additional components/subcomponents of the UE 104/204. Further, for example, the methods 1400, 1500, and 1600 may be performed by one or more of a processor 1712, a transceiver 1702, the modem 145, the relay component 147, and/or one or more additional components/subcomponents of the relay UE 104/206.

Figure 11:
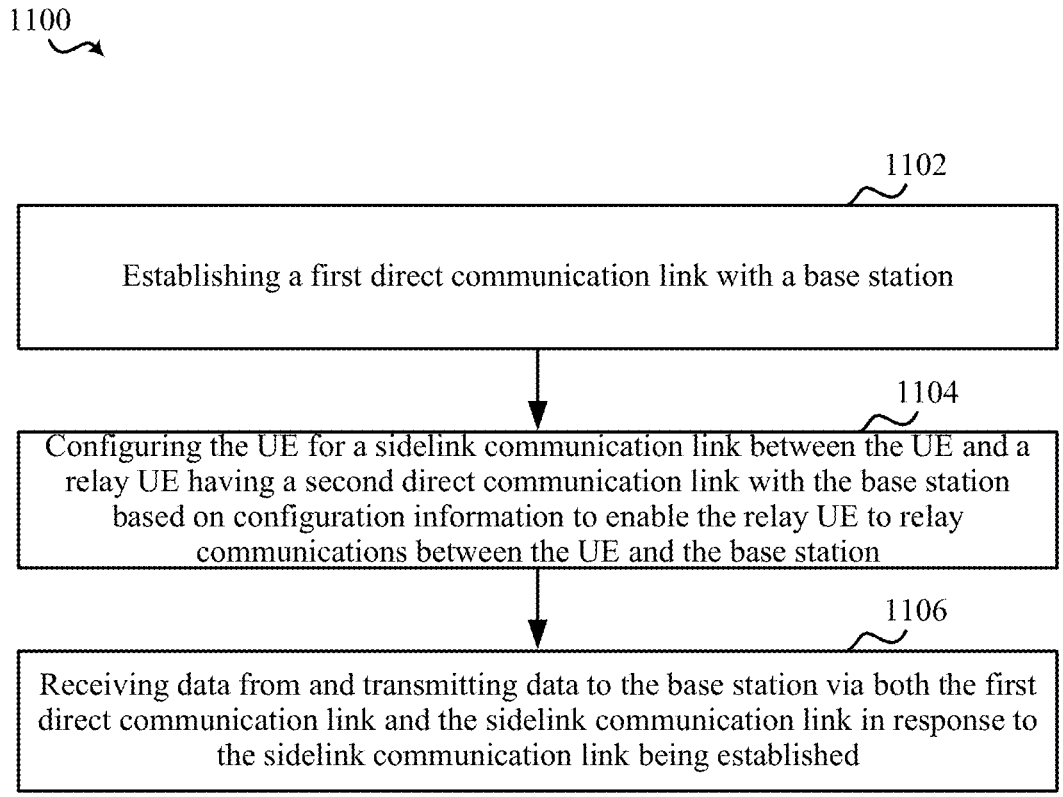
FIG. 11-13 are flowcharts of example methods of wireless communications by a UE, according to aspects of the present disclosure.

Turning to FIG. 11, the method 1100 may be used by the UE 204 when the UE 204 is in coverage of the base station 102 and the relay UE 206, and the direct communication links 210, 212 both may be used to communicate with the base station 102 to provide dual connectivity and avoid communication failures. Examples of the operations of the method 1100 are described in relation to FIG. 4.

In an example, at 1102, the method 1100 may include establishing a first direct communication link with a base station. For example, one or more of the processor 1712, the transceiver 1702, the modem 144, the relay component 146, and/or one or more components/subcomponents of the UE 104 may be configured to establish the direct communication link 210 with the base station 102. Thus, the processor 1712, the transceiver 1702, the modem 144, the relay component 146, and/or one or more components/subcomponents of the UE 104 may define the means for establishing the direct communication link 210 with the base station 102. In an example, the UE 204 and the base station 102 may establish the direct communication link 210 through any conventional means, as described by action 1 of FIG. 4.

At 1104, the method 1100 may include configuring the UE for a SL communication link between the UE and a relay UE having a second direct communication link with the base station based on configuration information to enable the relay UE to relay communications between the UE and the base station. For example, one or more of the processor 1712, the transceiver 1702, the modem 144, the relay component 146, and/or one or more components/subcomponents of the UE 104 may be configured to configure the UE 204 for the SL communication link 214 between the UE 204 and a relay UE 206 having the direct communication link 212 with the base station 102 based on configuration information to enable the relay UE 206 to relay communications between the UE 204 and the base station 102. Thus, the processor 1712, the transceiver 1702, the modem 144, the relay component 146, and/or one or more components/subcomponents of the UE 104 may define the means for configuring the UE 204 for the SL communication link 214 between the UE 204 and a relay UE 206 having the direct communication link 212 with the base station 102 based on configuration information to enable the relay UE 206 to relay communications between the UE 204 and the base station 102. In an example, the configuration information may include the SL configuration information described by actions 5 and 6 of FIG. 4, or the SL configuration information of actions 12 and 14 of FIG. 4.

At 1106, the method 1100 may include receiving data from and transmitting data to the base station via both the first direct communication link and the SL communication link in response to the SL communication link being established. For example, one or more of the processor 1712, the transceiver 1702, the modem 144, the relay component 146, and/or one or more components/subcomponents of the UE 104 may be configured to receive data from and transmit data to the base station 102 via both the direct communication link 210 and the SL communication link 214 in response to the SL communication link 214 being established. Thus, the processor 1712, the transceiver 1702, the modem 144, the relay component 146, and/or one or more components/subcomponents of the UE 104 may define the means for receiving data from and transmitting data to the base station 102 via both the direct communication link 210 and the SL communication link 214 in response to the SL communication link 214 being established. In an example, the UE 204 may communicate with the base station 102 via (1) the direct communication link 210 and (2) relay UE 206 using the direct communication links 212 and the SL communication link 214, as described by actions 17 and 18 of FIG. 4.

Figure 12:
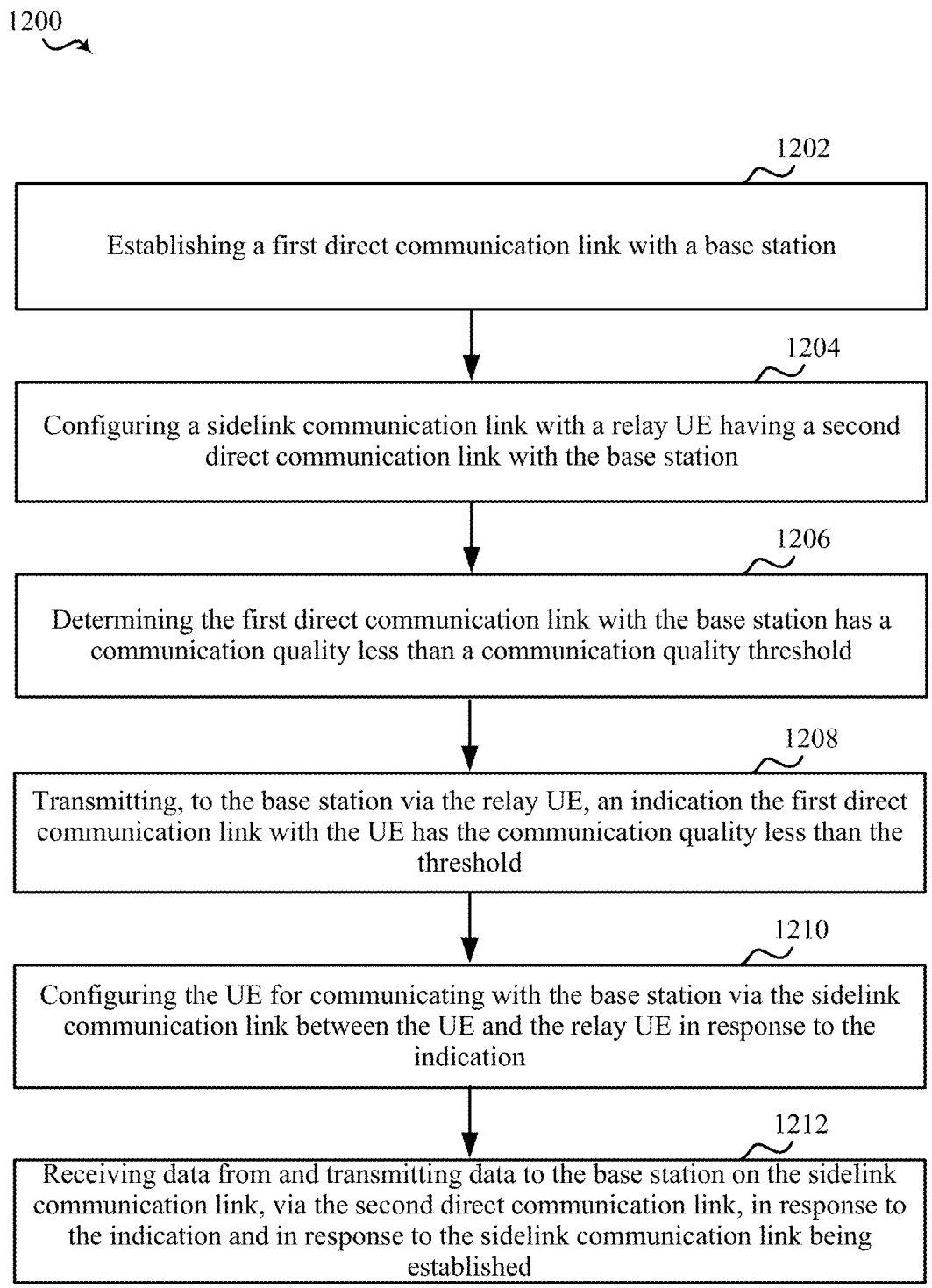

Turning to FIG. 12, the method 1200 may be used by the UE 204 when the UE 204 is in coverage of the base station 102 and the relay UE 206, and the UE 204 decides to use a relay connection (e.g., a direct connection between the base station 102 and the relay UE 206, which has a SL communication with the UE 204) in response to the direct communication link 210 between the UE 204 and the base station 102 deteriorating, to avoid communication failures. Examples of the operations of the method 1200 are described in relation to FIG. 5.

In an example, at 1202, the method 1200 may include establishing a first direct communication link with a base station. For example, one or more of the processor 1712, the transceiver 1702, the modem 144, the relay component 146, and/or one or more components/subcomponents of the UE 104 may be configured to establish the direct communication link 210 with the base station 102. Thus, the processor 1712, the transceiver 1702, the modem 144, the relay component 146, and/or one or more components/subcomponents of the UE 104 may define the means for establishing the direct communication link 210 with the base station 102.

In an example, the UE 204 and the base station 102 may establish the direct communication link 210 through any conventional means, as described by action 1 of FIG. 5.

At 1204, the method 1200 may include configuring a SL communication link with a relay UE having a second direct communication link with the base station. For example, one or more of the processor 1712, the transceiver 1702, the modem 144, the relay component 146, and/or one or more components/subcomponents of the UE 104 may be configured to configure the SL communication link 214 with the relay UE 206 having the direct communication link 212 with the base station 102. Thus, the processor 1712, the transceiver 1702, the modem 144, the relay component 146, and/or one or more components/subcomponents of the UE 104 may define the means for configuring the SL communication link 214 with the relay UE 206 having the direct communication link 212 with the base station 102. In an example, the UE 204 and the relay UE 206 may establish the SL communication link 214 based on action 10-16 of FIG. 5.

At 1206, the method 1200 may include determining the first direct communication link with the base station has a communication quality less than a communication quality threshold. For example, one or more of the processor 1712, the transceiver 1702, the modem 144, the relay component 146, and/or one or more components/subcomponents of the UE 104 may be configured to determine the direct communication link 210 with the base station 102 has a communication quality less than a communication quality threshold. Thus, the processor 1712, the transceiver 1702, the modem 144, the relay component 146, and/or one or more components/subcomponents of the UE 104 may define the means for determining the direct communication link 210 with the base station 102 has a communication quality less than a communication quality threshold. In an example, the UE 204 may determine the direct communication link 210 with the base station 102 has a communication quality less than a communication quality threshold, as illustrated by action 9 of FIG. 5. In an example, communication quality may be based on one or more parameters including, but not limited to, a channel condition, a packet error rate, or a received signal strength of the direct communication link 210.

At 1208, the method 1200 may include transmitting, to the base station via the relay UE, an indication the first direct communication link with the UE has the communication quality less than the threshold. For example, one or more of the processor 1712, the transceiver 1702, the modem 144, the relay component 146, and/or one or more components/subcomponents of the UE 104 may be configured to transmit, to the base station 102 via the relay UE 206, an indication the direct communication link 210 with the UE 204 has the communication quality less than the threshold. Thus, the processor 1712, the transceiver 1702, the modem 144, the relay component 146, and/or one or more components/subcomponents of the UE 104 may define the means for transmitting, to the base station 102 via the relay UE 206, an indication the direct communication link 210 with the UE 204 has the communication quality less than the threshold. In an example, the indication may be transmitted via an SL measurement report transferred to the base station 102, as illustrated by actions 10 and 11 of FIG. 5.

At 1210, the method 1200 may include configuring the UE for communicating with the base station via the SL communication link between the UE and the relay UE in response to the indication. For example, one or more of the processor 1712, the transceiver 1702, the modem 144, the relay component 146, and/or one or more components/subcomponents of the UE 104 may be configured to configure the UE 204 for communicating with the base station 102 via the SL communication link 214 between the UE 204 and the relay UE 206 in response to the indication. Thus, the processor 1712, the transceiver 1702, the modem 144, the relay component 146, and/or one or more components/subcomponents of the UE 104 may define the means for configuring the UE 204 for communicating with the base station 102 via the SL communication link 214 between the UE 204 and the relay UE 206 in response to the indication. For example, the UE 204 may receive SL configuration information via the relay UE 206 at action 14 and 15 of FIG. 5.

At 1212, the method 1200 may include receiving data from and transmitting data to the base station on the SL communication link, via the second direct communication link, in response to the indication and in response to the SL communication link being established. For example, one or more of the processor 1712, the transceiver 1702, the modem 144, the relay component 146, and/or one or more components/subcomponents of the UE 104 may be configured to receive data from and transmit data to the base station 102 on the SL communication link 214, via the direct communication link 212, in response to the indication and in response to the SL communication link 214 being established. Thus, the processor 1712, the transceiver 1702, the modem 144, the relay component 146, and/or one or more components/subcomponents of the UE 104 may define the means for receiving data from and transmitting data to the base station 102 on the SL communication link 214, via the direct communication link 212, in response to the indication and in response to the SL communication link 214 being established. For example, the UE 204 may communicate with the base station 102 via the relay UE 206 using the direct communication links 212 and the SL communication link 214, as described by action 19 of FIG. 5.

Figure 13:
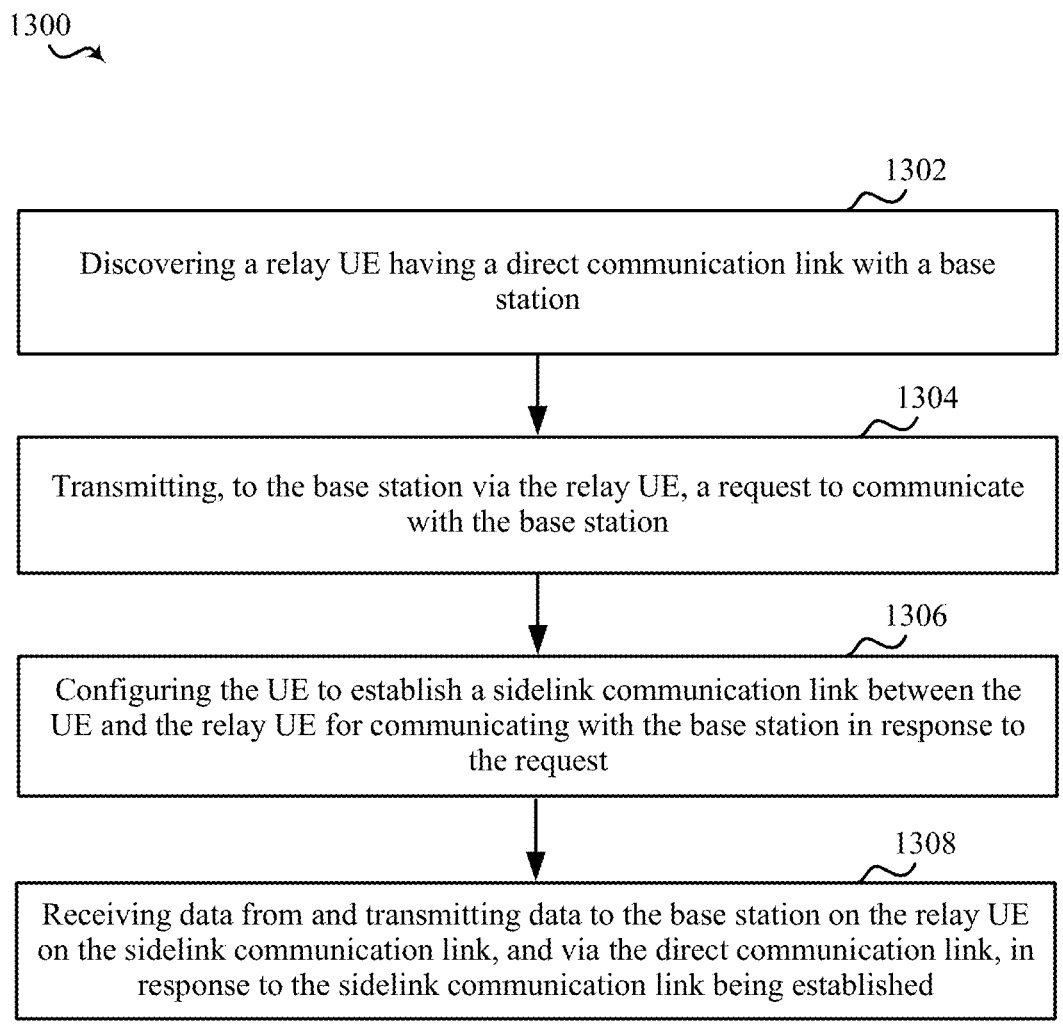

Turning to FIG. 13, the method 1300 may be used by the UE 204 when the UE 204 is in coverage of the relay UE 206, and the UE 204 decides to use a relay connection (e.g., a direct connection between the base station and the relay UE, which has a SL communication with the UE) to enable relayed communications with the base station 102 and avoid communication failures. Examples of the operations of the method 1300 are described in relation to FIG. 6.

In an example, at 1302, the method 1300 may include discovering a relay UE having a direct communication link with a base station. For example, one or more of the processor 1712, the transceiver 1702, the modem 144, the relay component 146, and/or one or more components/subcomponents of the UE 104 may be configured to discover the relay UE 206 having the direct communication link 212 with the base station 102. Thus, the processor 1712, the transceiver 1702, the modem 144, the relay component 146, and/or one or more components/subcomponents of the UE 104 may define the means for discovering the relay UE 206 having the direct communication link 212 with the base station 102. In an example, the UE 204 and the relay UE 206 may establish the SL communication link 212 through any conventional means, as described by action 5 of FIG. 6.

At 1304, the method 1300 may include transmitting, to the base station via the relay UE, a request to communicate with the base station. For example, one or more of the processor 1712, the transceiver 1702, the modem 144, the relay component 146, and/or one or more components/subcomponents of the UE 104 may be configured to transmit, to the base station 102 via the relay UE 206, a request to communicate with the base station 102. Thus, the processor 1712, the transceiver 1702, the modem 144, the relay component 146, and/or one or more components/subcomponents of the UE 104 may define the means for transmitting, to the base station 102 via the relay UE 206, a request to communicate with the base station 102. For example, at action 6 of FIG. 6, the UE 204 may send a setup request intended for the base station 102 to the relay UE 206 via the SL communication link 214.

At 1306, the method 1300 may include configuring the UE to establish a SL communication link between the UE and the relay UE for communicating with the base station in response to the request. For example, one or more of the processor 1712, the transceiver 1702, the modem 144, the relay component 146, and/or one or more components/subcomponents of the UE 104 may be configured to configure the UE 204 to establish the SL communication link 214 between the UE 204 and the relay UE 206 for communicating with the base station 102 in response to the request. Thus, the processor 1712, the transceiver 1702, the modem 144, the relay component 146, and/or one or more components/subcomponents of the UE 104 may define the means for configuring the UE 204 to establish the SL communication link 214 between the UE 204 and the relay UE 206 for communicating with the base station 102 in response to the request. For example, the UE 204 may receive setup configuration information at action 12 of FIG. 6 for configuring the UE 204 to establish the SL communication link 214.

At 1308, the method 1300 may include receiving data from and transmitting data to the base station on the relay UE on the SL communication link, and via the direct communication link, in response to the SL communication link being established. For example, one or more of the processor 1712, the transceiver 1702, the modem 144, the relay component 146, and/or one or more components/subcomponents of the UE 104 may be configured to receive data from and transmit data to the base station 102 on the relay UE 206 on the SL communication link 214, and via the direct communication link 212, in response to the SL communication link 214 being established. Thus, the processor 1712, the transceiver 1702, the modem 144, the relay component 146, and/or one or more components/subcomponents of the UE 104 may define the means for receiving data from and transmitting data to the base station 102 on the relay UE 206 on the SL communication link 214, and via the direct communication link 212, in response to the SL communication link 214 being established. For example, the UE 204 may communicate with the base station 102 via the relay UE 206 using the direct communication links 212 and the SL communication link 214, as described by action 16 of FIG. 6.

Figure 14:
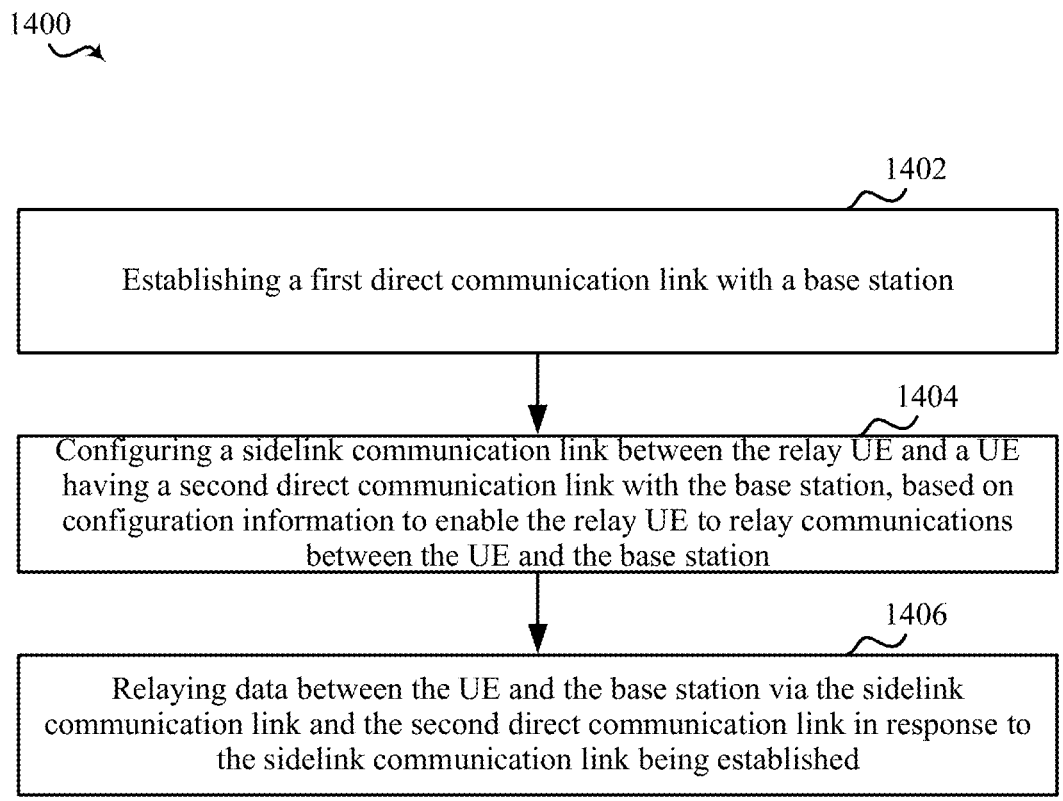
FIG. 14-16 are flowcharts of example methods of wireless communications by a relay UE, according to aspects of the present disclosure.

Turning to FIG. 14, the method 1100 may be used by the relay UE 206 when the UE 204 is in coverage of the base station 102 and the relay UE 206, and the direct communication links 210, 212 both may be used by the UE 204 to communicate with the base station 102 to provide dual connectivity and avoid communication failures. Examples of the operations of the method 1400 are described in relation to FIG. 4.

For example, at 1402, the method 1400 may include establishing a first direct communication link with a base station. For example, one or more of the processor 1712, the transceiver 1702, the modem 144, the relay component 146, and/or one or more components/subcomponents of the UE 104 may be configured to establish the direct communication link 212 with the base station 102. Thus, the processor 1712, the transceiver 1702, the modem 144, the relay component 146, and/or one or more components/subcomponents of the UE 104 may define the means for establishing the direct communication link 212 with the base station 102. In an example, the relay UE 206 and the base station 102 may establish the direct communication link 212 through any conventional means, as described by action 2 of FIG. 4.

At 1404, the method 1400 may include configuring a SL communication link between the relay UE and a UE having a second direct communication link with the base station, based on configuration information to enable the relay UE to relay communications between the UE and the base station. For example, one or more of the processor 1712, the transceiver 1702, the modem 144, the relay component 146, and/or one or more components/subcomponents of the UE 104 may be configured to configure the SL communication link 214 between the relay UE 206 and the UE 204 having the direct communication link 210 with the base station 102, based on configuration information to enable the relay UE 206 to relay communications between the UE 204 and the base station 102. Thus, the processor 1712, the transceiver 1702, the modem 144, the relay component 146, and/or one or more components/subcomponents of the UE 104 may define the means for configuring the SL communication link 214 between the relay UE 206 and the UE 204 having the direct communication link 210 with the base station 102, based on configuration information to enable the relay UE 206 to relay communications between the UE 204 and the base station 102. In an example, the relay UE 206 and the UE 204 may be configured based on configuration information described by actions 3-13 of FIG. 4.

At 1406, the method 1400 may include relaying data between the UE and the base station via the SL communication link and the second direct communication link in response to the SL communication link being established. For example, one or more of the processor 1712, the transceiver 1702, the modem 144, the relay component 146, and/or one or more components/subcomponents of the UE 104 may be configured to relay data between the UE 204 and the base station 102 via the SL communication link 214 and the direct communication link 212 in response to the SL communication link 214 being established. Thus, the processor 1712, the transceiver 1702, the modem 144, the relay component 146, and/or one or more components/subcomponents of the UE 104 may define the means for relaying data between the UE 204 and the base station 102 via the SL communication link 214 and the direct communication link 212 in response to the SL communication link 214 being established. In an example, the relay UE 206 may relay communications between the base station 102 and the UE 204 via the direct communication links 212 and the SL communication link 214, as described by actions 17 and 18 of FIG. 4.

Figure 15:
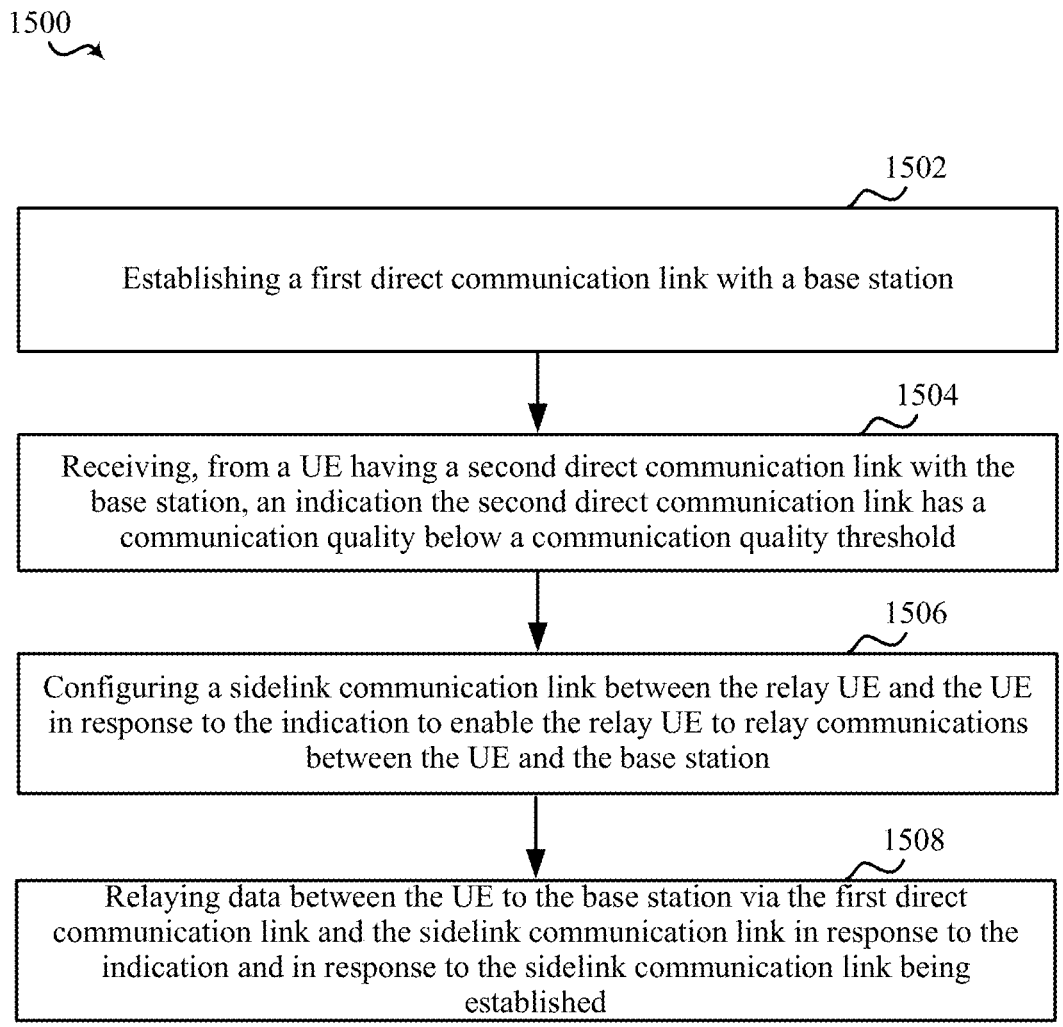

Turning to FIG. 15, the method 1500 may be used by the relay UE 206 when the UE 204 is in coverage of the base station 102 and the relay UE 204, and the UE 204 decides to use a relay connection (e.g., a direct connection between the base station and the relay UE, which has a SL communication with the UE) in response to the direct communication link 210 between the UE 204 and the base station 102 deteriorating, to avoid communication failures. Examples of the operations of the method 1500 are described in relation to FIG. 5.

In an example, at 1502, the method 1500 may include establishing a first direct communication link with a base station. For example, one or more of the processor 1712, the transceiver 1702, the modem 144, the relay component 146, and/or one or more components/subcomponents of the UE 104 may be configured to establish the direct communication link 212 with the base station 102. Thus, the processor 1712, the transceiver 1702, the modem 144, the relay component 146, and/or one or more components/subcomponents of the UE 104 may define the means for establishing the direct communication link 212 with the base station 102. In an example, the relay UE 206 and the base station 102 may establish the direct communication link 212 through any conventional means, as described by action 2 of FIG. 5.

At 1504, the method 1500 may include receiving, from a UE having a second direct communication link with the base station, an indication the second direct communication link has a communication quality below a communication quality threshold. For example, one or more of the processor 1712, the transceiver 1702, the modem 144, the relay component 146, and/or one or more components/subcomponents of the UE 104 may be configured to receiving, from the UE 204 having the direct communication link 210 with the base station 102, an indication the direct communication link 210 has a communication quality below a communication quality threshold. In an example, the relay UE 206 may receive the indication via an SL measurement report as described by action 11 of FIG. 5. In an example, communication quality may be based on one or more parameters including, but, not limited to, a channel condition, a packet error rate, or a received signal strength of the direct communication link 210.

At 1506, the method 1500 may include configuring a SL communication link between the relay UE and the UE in response to the indication to enable the relay UE to relay communications between the UE and the base station. For example, one or more of the processor 1712, the transceiver 1702, the modem 144, the relay component 146, and/or one or more components/subcomponents of the UE 104 may be configured to configure the SL communication link 214 between the relay UE 206 and the UE 204 in response to the indication to enable the relay UE 206 to relay communications between the UE 204 and the base station 102. Thus, the processor 1712, the transceiver 1702, the modem 144, the relay component 146, and/or one or more components/subcomponents of the UE 104 may define the means for configuring the SL communication link 214 between the relay UE 206 and the UE 204 in response to the indication to enable the relay UE 206 to relay communications between the UE 204 and the base station 102. For example, the relay UE 206 may be configured based on SL configuration information describe at action 12 and 13 of FIG. 5.

At 1508, the method 1500 may include relaying data between the UE to the base station via the first direct communication link and the SL communication link in response to the indication and in response to the SL communication link being established. For example, one or more of the processor 1712, the transceiver 1702, the modem 144, the relay component 146, and/or one or more components/subcomponents of the UE 104 may be configured to relay data between the UE 204 to the base station 102 via the direct communication link 212 and the SL communication link 214 in response to the indication and in response to the SL communication link 214 being established. Thus, the processor 1712, the transceiver 1702, the modem 144, the relay component 146, and/or one or more components/subcomponents of the UE 104 may define the means for relaying data between the UE 204 to the base station 102 via the direct communication link 212 and the SL communication link 214 in response to the indication and in response to the SL communication link 214 being established. For example, the relay UE 206 may relay communications between the base station 102 and the UE 204 using the direct communication links 212 and the SL communication link 214, as described by action 19 of FIG. 5.

Figure 16:
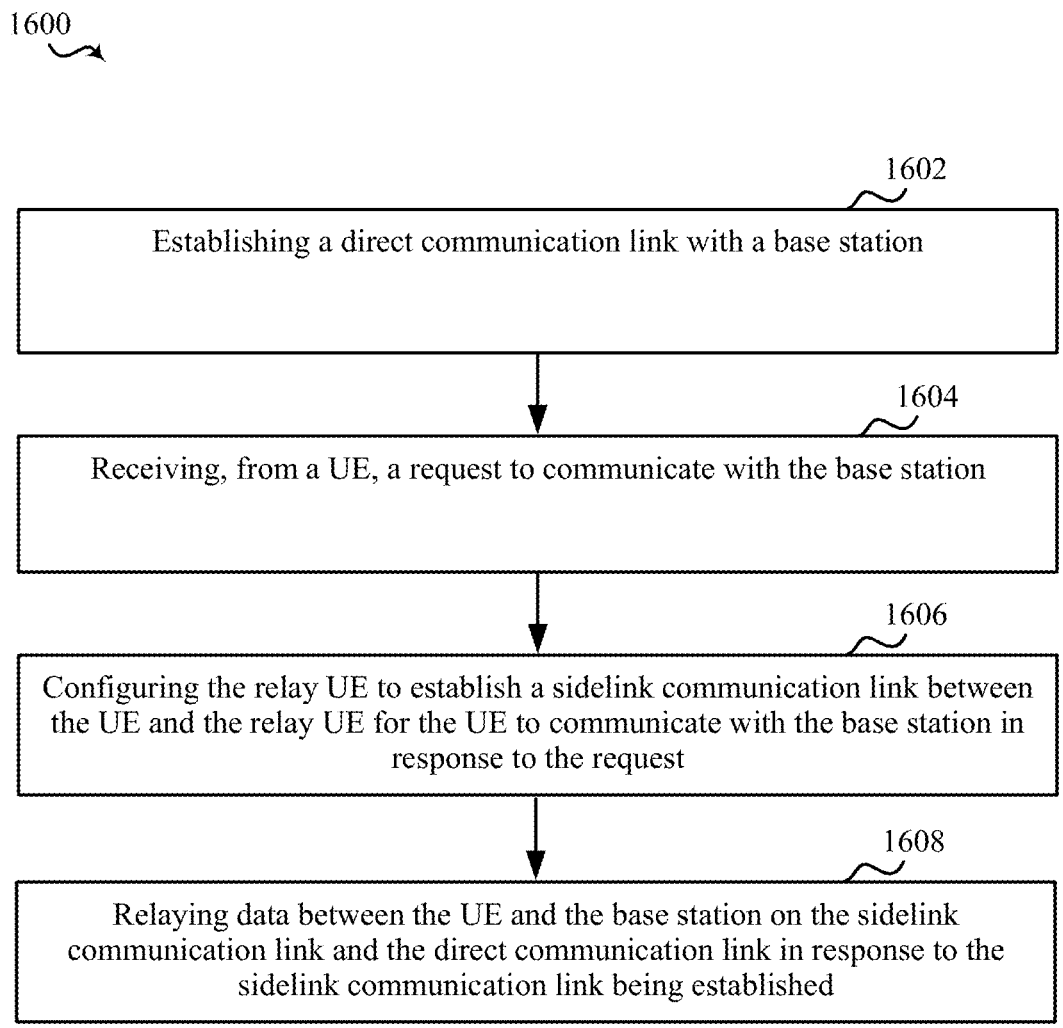

Turning to FIG. 16, the method 1600 may be used by the relay UE 206 when the UE 204 is in coverage of the relay UE 206, and the UE 204 decides to use a relay connection (e.g., a direct connection between the base station and the relay UE, which has a SL communication with the UE) to enable relayed communications with the base station 102 and avoid communication failures. For example, at 1602, the method 1600 may include establishing a direct communication link with a base station. For example, one or more of the processor 1712, the transceiver 1702, the modem 144, the relay component 146, and/or one or more components/subcomponents of the UE 104 may be configured to establish the direct communication link 212 with the base station 102. Thus, the processor 1712, the transceiver 1702, the modem 144, the relay component 146, and/or one or more components/subcomponents of the UE 104 may define the means for establishing the direct communication link 212 with the base station 102. Examples of the operations of the method 1600 are described in relation to FIG. 6.

At 1604, the method 1600 may include receiving, from a UE, a request to communicate with the base station. For example, one or more of the processor 1712, the transceiver 1702, the modem 144, the relay component 146, and/or one or more components/subcomponents of the UE 104 may be configured to receive, from the UE 204, a request to communicate with the base station 102. Thus, the processor 1712, the transceiver 1702, the modem 144, the relay component 146, and/or one or more components/subcomponents of the UE 104 may define the means for receiving, from the UE 204, a request to communicate with the base station 102. In an example, the relay UE 206 may receive an RRC setup request from the UE 204, as described by action 5 of FIG. 6.

At 1606, the method 1600 may include configuring the relay UE to establish a SL communication link between the UE and the relay UE for the UE to communicate with the base station in response to the request. For example, one or more of the processor 1712, the transceiver 1702, the modem 144, the relay component 146, and/or one or more components/subcomponents of the UE 104 may be configured to configure the relay UE 206 to establish the SL communication link 214 between the UE 204 and the relay UE 206 for the UE 204 to communicate with the base station 102 in response to the request. Thus, the processor 1712, the transceiver 1702, the modem 144, the relay component 146, and/or one or more components/subcomponents of the UE 104 may define the means for configuring the relay UE 206 to establish the SL communication link 214 between the UE 204 and the relay UE 206 for the UE 204 to communicate with the base station 102 in response to the request. For example, the relay UE 206 may receive RRC reconfiguration information, as described by action 9 of FIG. 6, to configure the relay UE 206.

At 1608, the method 1600 may include relaying data between the UE and the base station on the SL communication link and the direct communication link in response to the SL communication link being established. For example, one or more of the processor 1712, the transceiver 1702, the modem 144, the relay component 146, and/or one or more components/subcomponents of the UE 104 may be configured to relay data between the UE 204 and the base station 102 on the SL communication link 214 and the direct communication link 212 in response to the SL communication link 214 being established. Thus, the processor 1712, the transceiver 1702, the modem 144, the relay component 146, and/or one or more components/subcomponents of the UE 104 may define the means for relaying data between the UE 204 and the base station 102 on the SL communication link 214 and the direct communication link 212 in response to the SL communication link 214 being established. In an example, the relay UE 206 may relay communications between the base station 102 and the UE 204 via the direct communication links 212 and the SL communication link 214, as described by actions 17 and 18 of FIG. 4.

Figure 17:
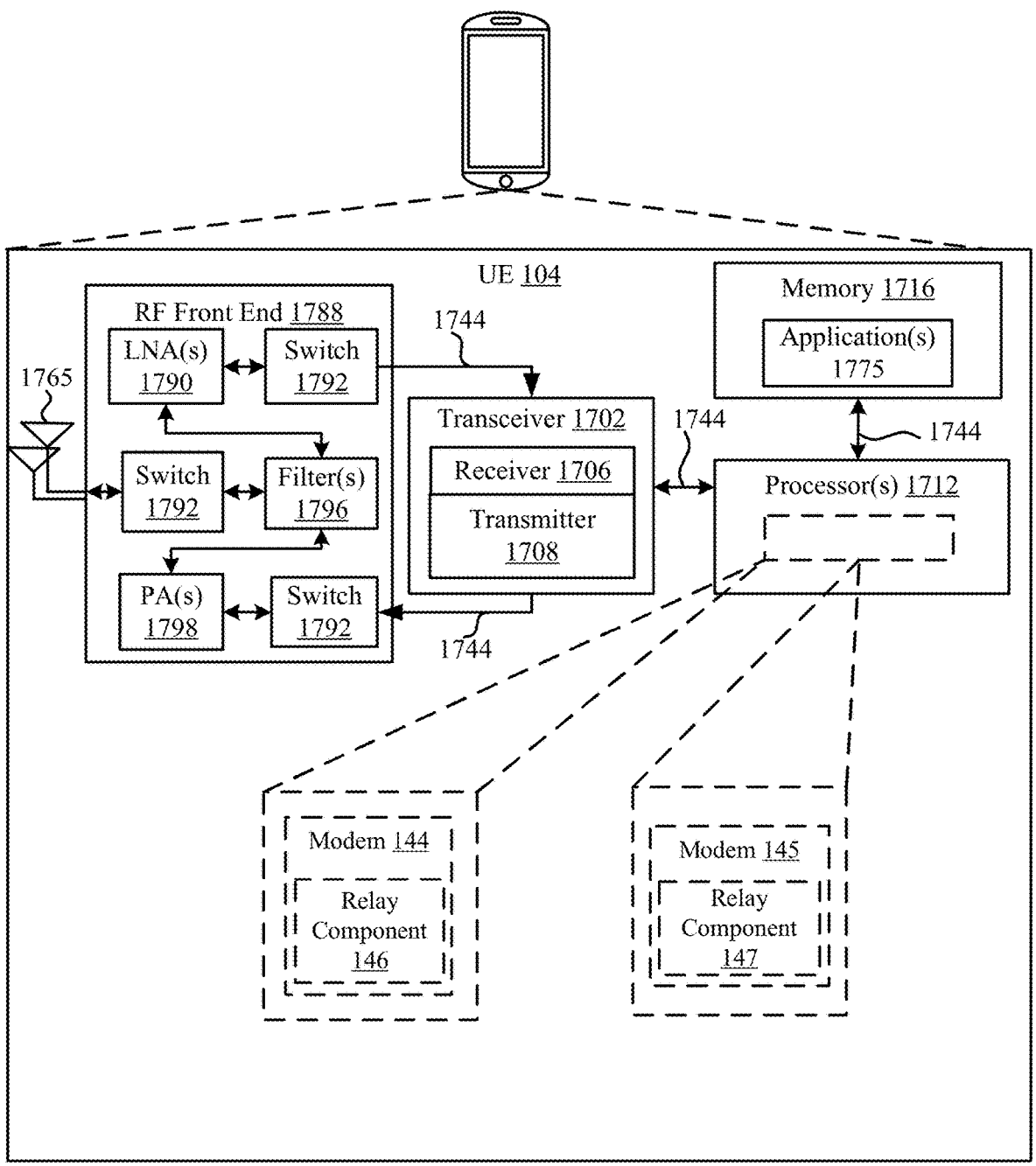
FIG. 17 is a schematic diagram of an example of the UE of FIG. 1, according to aspects of the present disclosure.

Referring to FIG. 17, one example of an implementation of the UE 104/204, or alternatively the relay UE 104/206, may include a variety of components, some of which have already been described above, but including components such as one or more processors 1712, memory 1716 and transceiver 1702 in communication via one or more buses 1744, which may operate in conjunction with modem 144 and the relay component 146 to enable one or more of the functions of the methods 1100, 1200, 1300, 1400, 1500, and 1600 described herein.

The transceiver 1702, receiver 1706, transmitter 1708, one or more processors 1712, memory 1716, applications 1775, buses 1744, RF front end 1788, LNAs 1790, switches 1792, filters 1796, PAs 1798, and one or more antennas 1765 may be the same as or similar to the corresponding components of the base station 102, as described above, but configured or otherwise programmed for UE operations as opposed to base station operations.

Further Example Embodiments

An example method of wireless communication by a base station, comprising: establishing a first direct communication link with a user equipment (UE); establishing a second direct communication link with a relay UE; communicating configuration information with the UE and the relay UE to individually configure the UE and the relay UE for a sidelink communication link to enable the relay UE to relay communications between the base station and the UE; and receiving data from and transmitting data to the UE on both the first direct communication link and the second direct communication link in response to the sidelink communication link being established.

The above example method, further comprising: receiving, from one or both of the UE or the relay UE, a capabilities message indicating a capability to establish the sidelink communication link, wherein the communicating is in response to the receiving the capabilities message.

One or more of the above example methods, further comprising: signaling, to one or both of the UE or the relay UE, common sidelink configuration information for establishing the sidelink communication link in response to the capabilities message.

One or more of the above example methods, wherein communicating with the UE and the relay UE to individually configure the UE and the relay UE for the sidelink communication link comprises: receiving, from the UE on the first direct communication link, a first sidelink measurement report; receiving, from the relay UE on the second direct communication link, a second sidelink measurement report; and determining the configuration information to configure the sidelink communication link based on at least one of the first sidelink measurement report or the second sidelink measurement report.

One or more of the above example methods, wherein the first direct communication link with the UE is via a first protocol stack, and the second direct communication link with the relay UE is via a second protocol stack different from the first protocol stack, wherein the second protocol stack is a layer 2 relay option protocol stack.

An example device (e.g., base station) comprising a transceiver, a memory configured to store instructions, and one or more processors communicatively coupled with the transceiver and the memory, wherein the one or more processors are configured to perform all or part of one or more of the above example methods.

An example apparatus for use in a device (e.g., base station) comprising means for wireless communication, means for storing instructions and data, and means for performing all or part of one or more of the above example methods.

An example computer-readable medium storing computer executable code for a device (e.g., base station), comprising code to perform all or part of one or more of the above example methods.

A second example method of wireless communication by a user equipment (UE), comprising: establishing a first direct communication link with a base station; configuring the UE for a sidelink communication link between the UE and a relay UE having a second direct communication link with the base station based on configuration information to enable the relay UE to relay communications between the UE and the base station; and receiving data from and transmitting data to the base station via both the first direct communication link and the sidelink communication link in response to the sidelink communication link being established.

The above second example method, further comprising: transmitting, to the base station, a capabilities message indicating a capability of the UE to establish the sidelink communication link, wherein the configuring of the UE for the sidelink communication link is in response to the transmitting the capabilities message.

One or more of the above second example methods, wherein configuring the UE for the sidelink communication link comprises: transmitting, to the base station on the first direct communication link, a sidelink measurement report; and receiving the configuration information for the sidelink communication link based on the sidelink measurement report.

One or more of the above second example methods, wherein receiving data from and transmitting data to the base station via the sidelink communication link comprises using a layer 2 relay option protocol stack.

A second example device (e.g., UE) comprising a transceiver, a memory configured to store instructions, and one or more processors communicatively coupled with the transceiver and the memory, wherein the one or more processors are configured to perform all or part of one or more of the above second example methods.

A second example apparatus for use in a device (e.g., UE) comprising means for wireless communication, means for storing instructions and data, and means for performing all or part of one or more of the above second example methods.

A second example computer-readable medium storing computer executable code for a device (e.g., UE), comprising code to perform all or part of one or more of the above second example methods.

A third example method of wireless communication by a relay user equipment (UE), comprising: establishing a first direct communication link with a base station; configuring a sidelink communication link between the relay UE and a UE having a second direct communication link with the base station, based on configuration information to enable the relay UE to relay communications between the UE and the base station; and relaying data between the UE and the base station via the sidelink communication link and the second direct communication link in response to the sidelink communication link being established.

The above third example method, further comprising: transmitting, to the base station, a capabilities message indicating a capability of the relay UE to establish the sidelink communication link, wherein the configuring is in response to the transmitting the capabilities message.

One or more of the above third example methods, wherein the configuring the sidelink communication link comprises: transmitting, to the base station on the second direct communication link, a sidelink measurement report; and receiving the configuration information for the sidelink communication link based on the sidelink measurement report.

One or more of the above third example methods, wherein relaying data from and transmitting data to the base station via the sidelink communication link and the second direct communication link comprises using a layer 2 relay option protocol stack.

A third example device (e.g., UE) comprising a transceiver, a memory configured to store instructions, and one or more processors communicatively coupled with the transceiver and the memory, wherein the one or more processors are configured to perform all or part of one or more of the above third example methods.

A third example apparatus for use in a device (e.g., UE) comprising means for wireless communication, means for storing instructions and data, and means for performing all or part of one or more of the above third example methods.

A third example computer-readable medium storing computer executable code for a device (e.g., UE), comprising code to perform all or part of one or more of the above third example methods.

A fourth example method of wireless communication by a base station, comprising: establishing a first direct communication link with a user equipment (UE); establishing a second direct communication link with a relay UE; communicating with the UE and the relay UE to individually configure the UE and the relay UE for a sidelink communication link between the UE and the relay UE; receiving, from the UE via the relay UE, an indication the first direct communication link with the UE has a communication quality below a communication quality threshold; and receiving data from and transmitting data to the UE on the second direct communication link in response to receiving the indication and in response to the sidelink communication link being established.

The above fourth example method, wherein the first direct communication link with the UE is via a first protocol stack, and the second direct communication link with the relay UE is via a second protocol stack different from the first protocol stack, wherein the second protocol stack is a layer 2 relay option protocol stack.

One or more of the above fourth example methods, further comprising: signaling, to one or both of the UE or the relay UE, common sidelink configuration information for establishing the sidelink communication link in response to a capabilities message from one or both of the UE or the relay UE.

A fourth example device (e.g., base station) comprising a transceiver, a memory configured to store instructions, and one or more processors communicatively coupled with the transceiver and the memory, wherein the one or more processors are configured to perform all or part of one or more of the above fourth example methods.

A fourth example apparatus for use in a device (e.g., base station) comprising means for wireless communication, means for storing instructions and data, and means for performing all or part of one or more of the above fourth example methods.

A fourth example computer-readable medium storing computer executable code for a device (e.g., base station), comprising code to perform all or part of one or more of the above fourth example methods.

A fifth example method of wireless communication by a user equipment (UE), comprising: establishing a first direct communication link with a base station; configuring a sidelink communication link with a relay UE having a second direct communication link with the base station; determining the first direct communication link with the base station has a communication quality less than a communication quality threshold; transmitting, to the base station via the relay UE, an indication the first direct communication link with the UE has the communication quality less than the communication quality threshold; configuring the UE for communicating with the base station via the sidelink communication link between the UE and the relay UE in response to the indication; and receiving data from and transmitting data to the base station on the sidelink communication link, via the second direct communication link, in response to the indication and in response to the sidelink communication link being established.

The above fifth example method, wherein receiving data from and transmitting data to the base station via the sidelink communication link and the second direct communication link comprises using a layer 2 relay option protocol stack.

One or more of the above fifth example methods, further comprising: receiving, from the base station, signaling to establish the sidelink communication link, wherein the configuring the sidelink communication link is in response to the receiving the signaling.

A fifth example device (e.g., UE) comprising a transceiver, a memory configured to store instructions, and one or more processors communicatively coupled with the transceiver and the memory, wherein the one or more processors are configured to perform all or part of one or more of the above fifth example methods.

A fifth example apparatus for use in a device (e.g., UE) comprising means for wireless communication, means for storing instructions and data, and means for performing all or part of one or more of the above fifth example methods.

A fifth example computer-readable medium storing computer executable code for a device (e.g., UE), comprising code to perform all or part of one or more of the above fifth example methods.

A sixth example method of wireless communication by a relay user equipment (UE), comprising: establishing a first direct communication link with a base station; receiving, from a UE having a second direct communication link with the base station, an indication the second direct communication link has a communication quality below a communication quality threshold; configuring a sidelink communication link between the relay UE and the UE in response to the indication to enable the relay UE to relay communications between the UE and the base station; and relaying data between the UE to the base station via the first direct communication link and the sidelink communication link in response to the indication and in response to the sidelink communication link being established.

The above sixth example method, wherein relaying data between the UE and the base station via first direct communication link and the sidelink communication link comprises using a layer 2 relay option protocol stack.

One or more of the above sixth example methods, further comprising: receiving, from the base station, signaling to establish the sidelink communication link, wherein the configuring the sidelink communication link is in response to the receiving the signaling.

A sixth example device (e.g., UE) comprising a transceiver, a memory configured to store instructions, and one or more processors communicatively coupled with the transceiver and the memory, wherein the one or more processors are configured to perform all or part of one or more of the above sixth example methods.

A sixth example apparatus for use in a device (e.g., UE) comprising means for wireless communication, means for storing instructions and data, and means for performing all or part of one or more of the above sixth example methods.

A sixth example computer-readable medium storing computer executable code for a device (e.g., UE), comprising code to perform all or part of one or more of the above sixth example methods.

A seventh example method of wireless communication by a base station, comprising: establishing a direct communication link with a relay user equipment (UE); receiving, from a UE via the relay UE, a request for the base station to communicate with the UE; communicating with the UE via the relay UE to individually configure the UE and the relay UE to establish a sidelink communication link between the UE and the relay UE for the UE to communicate with the base station in response to the request; and receiving data from and transmitting data to the UE on the direct communication link, and via the sidelink communication link, in response to the sidelink communication link being established.

The above seventh example method, wherein receiving data from and transmitting data to the UE on the direct communication link comprises using a layer 2 relay option protocol stack.

A seventh example device (e.g., base station) comprising a transceiver, a memory configured to store instructions, and one or more processors communicatively coupled with the transceiver and the memory, wherein the one or more processors are configured to perform all or part of one or more of the above seventh example methods.

A seventh example apparatus for use in a device (e.g., base station) comprising means for wireless communication, means for storing instructions and data, and means for performing all or part of one or more of the above seventh example methods.

A seventh example computer-readable medium storing computer executable code for a device (e.g., base station), comprising code to perform all or part of one or more of the above seventh example methods.

An eighth example method of wireless communication by a user equipment (UE), comprising: discovering a relay UE having a direct communication link with a base station; transmitting, to the base station via the relay UE, a request to communicate with the base station; configuring the UE to establish a sidelink communication link between the UE and the relay UE for communicating with the base station in response to the request; and receiving data from and transmitting data to the base station on the relay UE on the sidelink communication link, and via the direct communication link, in response to the sidelink communication link being established.

The above eighth example method, wherein receiving data from and transmitting data to the base station on the sidelink communication link comprises using a layer 2 relay option protocol stack.

One or more of the above eighth example methods, further comprising: transmitting, to the relay UE, a scheduling request to trigger the receiving the data and the transmitting the data.

An eighth example device (e.g., UE) comprising a transceiver, a memory configured to store instructions, and one or more processors communicatively coupled with the transceiver and the memory, wherein the one or more processors are configured to perform all or part of one or more of the above eighth example methods.

An eighth example apparatus for use in a device (e.g., UE) comprising means for wireless communication, means for storing instructions and data, and means for performing all or part of one or more of the above eighth example methods.

An eighth example computer-readable medium storing computer executable code for a device (e.g., UE), comprising code to perform all or part of one or more of the above eighth example methods.

A ninth example method of wireless communication by a relay user equipment (UE), comprising: establishing a direct communication link with a base station; receiving, from a UE, a request to communicate with the base station; configuring the relay UE to establish a sidelink communication link between the UE and the relay UE for the UE to communicate with the base station in response to the request; and relaying data between the UE and the base station on the sidelink communication link and the direct communication link in response to the sidelink communication link being established.

The above ninth example method, wherein relaying data between the UE and the base station on the sidelink communication link and the direct communication link comprises using a layer 2 relay option protocol stack.

One or more of the above ninth example methods, further comprising: receiving, from the UE, a scheduling request to trigger the relaying the data.

A ninth example device (e.g., UE) comprising a transceiver, a memory configured to store instructions, and one or more processors communicatively coupled with the transceiver and the memory, wherein the one or more processors are configured to perform all or part of one or more of the above ninth example methods.

A ninth example apparatus for use in a device (e.g., UE) comprising means for wireless communication, means for storing instructions and data, and means for performing all or part of one or more of the above ninth example methods.

A ninth example computer-readable medium storing computer executable code for a device (e.g., UE), comprising code to perform all or part of one or more of the above ninth example methods.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A base station, comprising:
   a memory storing instructions; and
   one or more processors communicatively coupled with the memory and configured to:
   establish a first direct communication link with a user equipment (UE);
   establish a second direct communication link with a relay UE;
   communicate a configuration information with the UE and the relay UE to individually configure the UE and the relay UE for a sidelink communication link to enable the relay UE to relay communications between the base station and the UE; and
   receive data from and transmit the data to the UE on both the first direct communication link and the second direct communication link in response to the sidelink communication link being established with the transmitted data on the first direct communication link and the second direct communication link being duplicative using packet data convergence protocol (PDCP).

2. The base station of claim 1, wherein the one or more processors is further configured to:
   receive, from one or both of the UE or the relay UE, a capabilities message indicating a capability to establish the sidelink communication link, wherein communicating the configuration information is in response to receiving the capabilities message.

3. The base station of claim 2, wherein the one or more processors is further configured to:
   signal, to one or both of the UE or the relay UE, common sidelink configuration information for establishing the sidelink communication link in response to the capabilities message.

4. The base station of claim 1, wherein the one or more processors is further configured to:
   receive, from the UE on the first direct communication link, a first sidelink measurement report; and
   determine the configuration information to configure the sidelink communication link based on the first sidelink measurement report.

5. The base station of claim 1, wherein the one or more processors is further configured to:
   receive, from the relay UE on the second direct communication link, a second sidelink measurement report; and determine the configuration information to configure the sidelink communication link based on the second sidelink measurement report.

6. The base station of claim 1, wherein:
the first direct communication link with the UE is via a first protocol stack;
the second direct communication link with the relay UE is via a second protocol stack different from the first protocol stack; and
the second protocol stack is a layer 2 relay option protocol stack.

7. The base station of claim 1, wherein the one or more processors is further configured to:
receive, from one or both of the UE or the relay UE, a confirmation that configuration of the UE or the relay UE based on the configuration information is complete, wherein the data is received from and transmitted to the UE in response to receiving the confirmation.

8. A user equipment (UE), comprising:
a memory storing instructions; and
one or more processors communicatively coupled with the memory and configured to:
establish a first direct communication link with a base station;
establish a sidelink communication link between the UE and a relay UE having a second direct communication link with the base station based on a configuration information to enable the relay UE to relay communications between the UE and the base station; and
receive data from and transmit the data to the base station via both the first direct communication link and the sidelink communication link in response to the sidelink communication link being established with the transmitted data on the first direct communication link and the sidelink communication link being duplicative using packet data convergence protocol (PDCP).

9. The UE of claim 8, wherein the one or more processors is further configured to:
transmit, to the base station, a capabilities message indicating a capability of the UE to establish the sidelink communication link, wherein the UE is configured for the sidelink communication link in response to transmitting the capabilities message.

10. The UE of claim 8, wherein the one or more processors is further configured to:
transmit, to the base station on the first direct communication link, a sidelink measurement report; and
receive the configuration information for the sidelink communication link based on the sidelink measurement report.

11. The UE of claim 8, wherein the data is received from and transmitted to the base station via the sidelink communication link using a layer 2 relay option protocol stack.

12. The UE of claim 8, wherein the one or more processors is further configured to:
receive, from the base station, the configuration information.

13. The UE of claim 8, wherein the one or more processors is further configured to:
transmit, to the relay UE, a scheduling request to trigger receiving the data and transmitting the data.

14. The UE of claim 8, wherein the one or more processors is further configured to:
transmit, to the base station, a confirmation that configuration of the UE based on the configuration information is complete, wherein the data is received from and transmitted to the base station in response to transmitting the confirmation.

15. A relay user equipment (UE), comprising:
a memory storing instructions; and
one or more processors communicatively coupled with the memory and configured to:
establish a first direct communication link with a base station;
establish a sidelink communication link between the relay UE and a UE having a second direct communication link with the base station, based on a configuration information to enable the relay UE to relay communications between the UE and the base station; and
relay data between the UE and the base station via the sidelink communication link and the second direct communication link in response to the sidelink communication link being established with the data transmitted to and from the relay UE being duplicative of data transmitted directly between the base station and the UE using packet data convergence protocol (PDCP).

16. The relay UE of claim 15, wherein the one or more processors is further configured to:
transmit, to the base station, a capabilities message indicating a capability of the relay UE to establish the sidelink communication link, wherein the relay UE is configured for the sidelink communication link in response to transmitting the capabilities message.

17. The relay UE of claim 15, wherein the one or more processors is further configured to:
transmit, to the base station on the second direct communication link, a sidelink measurement report; and
receive the configuration information for the sidelink communication link based on the sidelink measurement report.

18. The relay UE of claim 15, wherein the data is relayed between the UE and the base station via the sidelink communication link and the second direct communication link using a layer 2 relay option protocol stack.

19. The relay UE of claim 15, wherein the one or more processors is further configured to:
receive, from the base station, the configuration information.

20. The relay UE of claim 15, wherein the one or more processors is further configured to:
receive, from the UE, a scheduling request to trigger the relaying of the data.

21. The relay UE of claim 15, wherein the one or more processors is further configured to:
transmit, to the base station, a confirmation that configuration of the sidelink communication link is complete, wherein the data relayed in response to transmitting the confirmation.

22. A method of wireless communication by a base station, comprising:
establishing a first direct communication link with a user equipment (UE);
establishing a second direct communication link with a relay UE;
communicating configuration information with the UE and the relay UE to individually configure the UE and the relay UE for a sidelink communication link to enable the relay UE to relay communications between the base station and the UE; and receiving data from and transmitting data to the UE on both the first direct communication link and the second direct communication link in response to the sidelink communication link being established with the transmitted data on the first direct communication link and the second direct communication link being duplicative using packet data convergence protocol (PDCP).

23. The method of claim 22, further comprising:
receiving, from one or both of the UE or the relay UE, a capabilities message indicating a capability to establish the sidelink communication link, wherein the communicating the configuration information is in response to the receiving the capabilities message.

24. The method of claim 23, further comprising:
signaling, to one or both of the UE or the relay UE, common sidelink configuration information for establishing the sidelink communication link in response to the capabilities message.

25. A method of wireless communication by a user equipment (UE), comprising:
establishing a first direct communication link with a base station;
establishing a sidelink communication link between the UE and a relay UE having a second direct communication link with the base station based on configuration information to enable the relay UE to relay communications between the UE and the base station; and
receiving data from and transmitting data to the base station via both the first direct communication link and the sidelink communication link in response to the sidelink communication link being established with transmitted data on the first direct communication link and the sidelink communication link being duplicative using packet data convergence protocol (PDCP).

26. The method of claim 25, further comprising:
transmitting, to the base station, a capabilities message indicating a capability of the UE to establish the sidelink communication link, wherein the establishing the sidelink communication link is in response to the transmitting the capabilities message.

27. The method of claim 25, wherein configuring the UE for the sidelink communication link comprises:
transmitting, to the base station on the first direct communication link, a sidelink measurement report; and
receiving the configuration information for the sidelink communication link based on the sidelink measurement report.

28. A method of wireless communication by a relay user equipment (UE), comprising:
establishing a first direct communication link with a base station;
establishing a sidelink communication link between the relay UE and a UE having a second direct communication link with the base station, based on configuration information to enable the relay UE to relay communications between the UE and the base station; and
relaying data between the UE and the base station via the sidelink communication link and the second direct communication link in response to the sidelink communication link being established with the data transmitted to and from the relay UE being duplicative of data transmitted directly between the base station and the UE using packet data convergence protocol (PDCP).

29. The method of claim 28, further comprising:
transmitting, to the base station, a capabilities message indicating a capability of the relay UE to establish the sidelink communication link, wherein the establishing the sidelink communication link is in response to the transmitting the capabilities message.

30. The method of claim 28, wherein the establishing the sidelink communication link comprises:
transmitting, to the base station on the second direct communication link, a sidelink measurement report; and
receiving the configuration information for the sidelink communication link based on the sidelink measurement report.

* * * * *